United States Patent [19]
Yokotani et al.

[11] Patent Number: 5,831,973
[45] Date of Patent: Nov. 3, 1998

[54] MULTICAST CONNECTION CONTROL METHOD AND APPARATUS

[75] Inventors: Tetsuya Yokotani; Tatsuki Ichihashi; Kazunori Kotaka; Kazuyuki Kashima; Keiichi Soda; Koichi Hiramatsu; Yukio Ushisako, all of Tokyo, Japan

[73] Assignee: Mitsubishi Denki Kabushiki Kaisha, Tokyo, Japan

[21] Appl. No.: 730,668

[22] Filed: Oct. 11, 1996

[30] Foreign Application Priority Data

Oct. 11, 1995 [JP] Japan .................................. 7-262873
Mar. 21, 1996 [JP] Japan .................................. 8-064546

[51] Int. Cl.[6] .................................................. H04L 12/56
[52] U.S. Cl. ............................................ 370/236; 370/398
[58] Field of Search .................................. 370/229, 230, 370/231, 232, 233, 234, 235, 236, 252, 253, 390, 395, 396, 397, 398, 399, 400, 409, 410, 412, 413, 414, 415, 416, 417, 418

[56] References Cited

U.S. PATENT DOCUMENTS

| | | | |
|---|---|---|---|
| 5,457,687 | 10/1995 | Newman .................................. | 370/232 |
| 5,515,359 | 5/1996 | Zheng ...................................... | 370/231 |
| 5,539,747 | 7/1996 | Ito et al. ................................. | 370/235 |
| 5,650,993 | 7/1997 | Lakshman et al. ..................... | 370/236 |
| 5,694,390 | 12/1997 | Yamato et al. ......................... | 370/230 |
| 5,701,291 | 12/1997 | Roberts ................................... | 370/232 |

FOREIGN PATENT DOCUMENTS

| | | |
|---|---|---|
| HEI6-326727 | 7/1988 | Japan . |
| SHO63-173437 | 11/1994 | Japan . |

OTHER PUBLICATIONS

The ATM Forum Traffic Management Specification v4.0, Apr. 1996, 23 pages.

*Primary Examiner*—Alpus H. Hsu
*Assistant Examiner*—Kwang B. Yao

[57] ABSTRACT

A multicast connection control apparatus provided in a branching-and-consolidating node connecting a source terminal to a plurality of destination terminals for branching information over the forward connection or consolidating information over the backward connection in a multicast connection ATM network system includes a congested status management table for managing congested status in all RM cells and a controller. The controller transmits only an uncongested status RM cell transmitted thereto last over the backward connection when all the connections in a sequence are found to be in the uncongested state. The controller also transmits only a congested status RM cell over the backward connection when one of the connections is found to be in the congested state and cancels the subsequent transmission of the congested status RM cells in the same sequence over the backward connection.

21 Claims, 23 Drawing Sheets

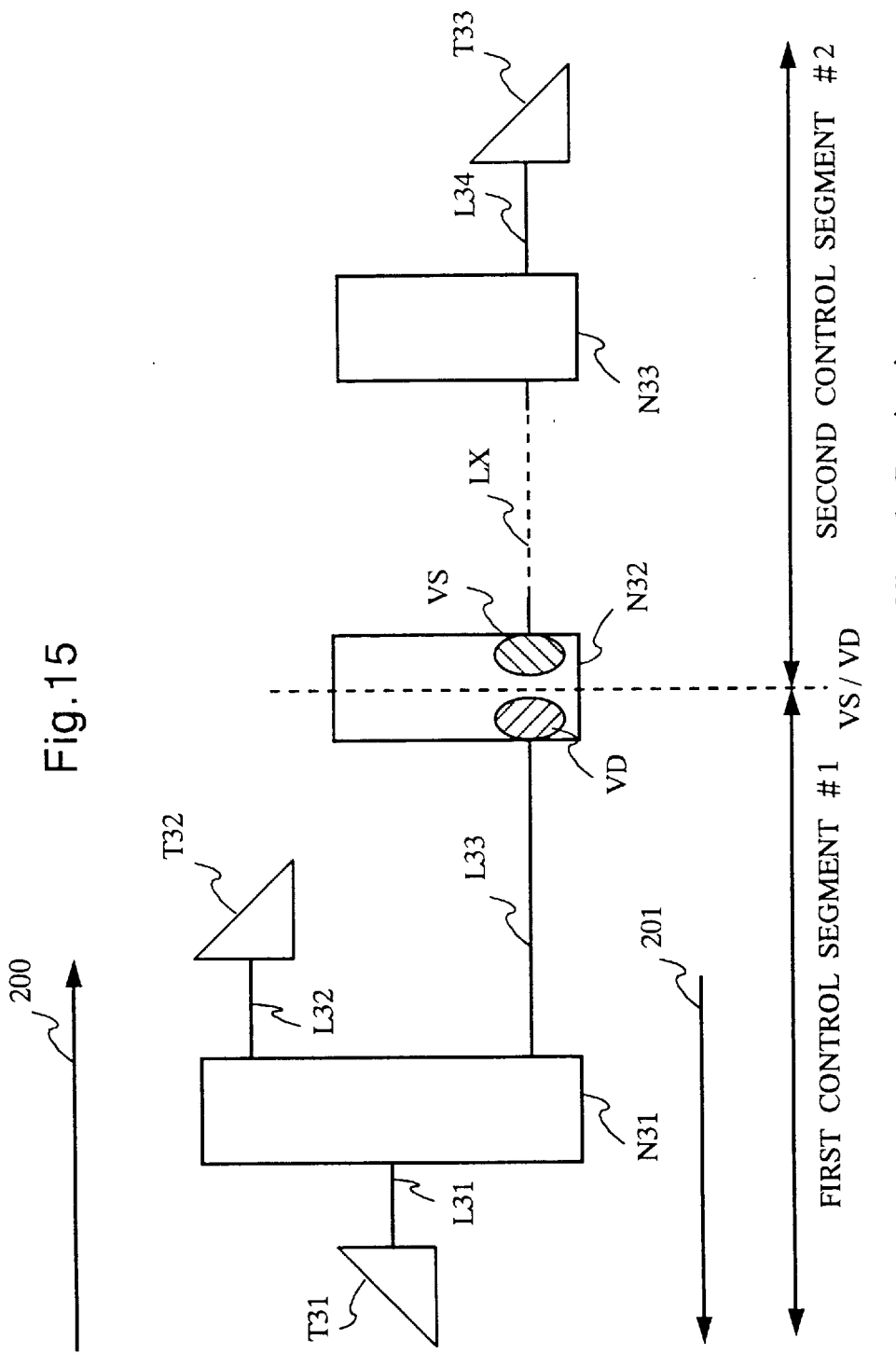

ADDITION OF DESTINATION TERMINAL

REDUCTION OF DESTINATION TERMINAL

MULTICAST CONNECTION CONTROL METHOD AND APPARATUS

BACKGROUND OF THE INVENTION

1. Field of the Invention

The present invention relates to a control method and a control system in an ATM (Asynchronous Transfer Mode) network for changing a rate for transmitting information from a source terminal depending on a congestion state of the ATM network when communication is implemented between the source terminal and a plurality of destination terminals.

2. Description of the Related Art

As one of the services provided on a conventional ATM network for changing the information transmitting rate, an ABR (Available Bit Rate) Service is disclosed. When communication is implemented between the source terminal and destination terminals, the ABR service renders the information transmitting rate variable depending on the congestion state of the ATM network. Consequently, cell transmission losses are reduced. In order to regulate this information transmitting rate, various methods have been conceived. One of the effective methods, the EPRCA (Enhanced Proportional Rate Control Algorithm), has been a main subject of controversy in the ATM forum and is discussed below.

The EPRCA is defined in the ATM Forum Contribution 94-394r5 Baseline Text for Traffic Management Sub-Working Group. This definition, however, is made for the unicast connection network alone. With regard to the multicast connection network, Japanese Unexamined Patent Application HEI6-326727, for example, discloses a method of setting multicast connections. Japanese Unexamined Patent Application SHO63-173437, on the other hand, discloses a control system for verifying whether information is transmitted link by link in the multicast connection network. A method of transmitting information to a plurality of destinations in the multicast connection network at a uniform transmitting rate using the EPRCA or some other method, has not been invented yet. Referring to the drawings, an operation of the EPRCA will be schematically described now.

FIG. 22 is a block diagram showing a network configuration and a communication system from the related art. In FIG. 22, reference numerals T1 and T2 denote source terminals. On the other hand, reference numerals T3 and T4 denote destination terminals which show communication between the source terminal T1 and the destination terminal T3 and communication between the source terminal T2 and the destination terminal T4.

Reference numerals N1 and N2 denote nodes for implementing ATM switching. Reference numerals L1, L2, L3, L4, and L5 denote physical transmission lines. The physical transmission lines herein allow two-way communication. Reference numerals C1 and C2 respectively denote a logical connection between the source terminal T1 and the destination terminal T3 and a logical connection between the source terminal T2 and the destination terminal T4. Both of these connections C1 and C2 are completely duplex lines. The forward connections from the source terminals to the destination terminals are indicated by C1$f$ and C2$f$, respectively. On the other hand, the backward connections are indicated by C1$b$ and C2$b$, respectively.

FIG. 23 is a block diagram showing a transmission timing of RM (resource management) cells in accordance with the EPRCA. Reference numerals U1 through U8 denote user cells for transmitting user information in the ATM. Reference numerals RM1 and RM2 denote RM cells.

FIG. 24 is a graph showing an example where the information transmitting rate in the source terminal which is hereinafter referred to as the forward connection transmitting rate is controlled in accordance with the EPRCA. The abscissa axis t represents an elapsed time, the ordinate axis represents the transmitting rate or ACR (Allowed Cell Rate), and t1 through t6 show the time at which the RM cell has been transmitted from or to the source terminal.

Referring to FIG. 22, an operation of the EPRCA is described schematically.

When information is transmitted as shown in FIG. 22 from the source terminal T1 to the destination terminal T3 and from the source terminal T2 to the destination terminal T4 over the forward connections C1$f$ and C2$f$, respectively, a contention for the traffic of both lines will occur, and congestion will take place in the node N1. If such congestion continues, a cell transmission loss will eventually occur. In order to prevent this situation, an EFCI (Explicit Forward Congestion Identification) mode and an ER (Explicit Rate) mode are provided in the EPRCA.

First, the EFCI mode is described.

In the source terminals T1 and T2, one RM cell is inserted at the end of each group of Nrm cells that include a plurality of user cells as shown in FIG. 23. In other words, one RM cell is inserted each time (Nrm−1) cells have been transmitted. Currently, it is proposed that the group of Nrm cells include 32 cells. In the EFCI mode, the source terminal initiates transmission of the cell stream at an ICR (Initial Cell Rate) at first. Then, this transmitting rate is reduced exponentially from the ICR until an RM cell indicative of an uncongested state of the network which is hereinafter referred to as an uncongested status RM cell is transmitted to the source terminal over the backward connection C1$b$ or C2$b$. The transmitting rate at which cell transmission is made possible at a predetermined time is referred to as the ACR (Allowed Cell Rate). Once an uncongested status RM cell is transmitted to the source terminal, the forward connection transmitting rate is increased in proportion to the ACR at that point.

FIG. 24 shows that at the t1, t3, and t5, RM cells are transmitted from the source terminal over the forward connections C1$f$ and C2$f$, and that at the t2 and t4, the forward connection transmitting rate increases because uncongested status RM cells are transmitted to the source terminal over the backward connection. As shown in FIG. 24, the source terminal receives an RM cell at the t6. This RM cell is, however, indicative of a congested state of the network, which is hereinafter referred to as a congested status RM cell. Consequently, the forward connection transmitting rate continues to decrease. FIG. 24 also shows that the ACR fluctuates between an MCR (Minimum Cell Rate) and a PCR (Peak Cell Rate).

Now, it is assumed herein that a congested state of the network is detected in a node and the node includes, for example, an output buffer switch. When the number of user cells to be output from the node over the forward connection or the backward connection exceeds a predetermined number, the EFCI-bit provided in the cell header of the user cell to be output is set. With regard to FIG. 22, the node N1 may become congested with transmitted user cells. When the node N1 becomes congested, the EFCI-bit in the user cell to be transmitted over the forward connection C1$f$ or C2$f$ is set.

Furthermore, upon receiving the RM cell transmitted immediately after the user cell in which the EFCI-bit is set, the destination terminals for such a user cell (the T3 and T4 in the case of FIG. 22) determine that the connections over which such a user cell has been transmitted are in the congested state. Consequently, the destination terminals transform the received RM cell into the congested status RM cell, and returns it over the backward connection so as to notify the source terminal of the congestion of the network. When the destination terminals receive the RM cell immediately after the user cell in which the EFCI-bit is not set, the destination terminal transforms the received RM cell into the uncongested status RM cell and returns it to the source terminal over the backward connection. This results in the aforementioned increase in the forward connection transmitting rate in the source terminal.

Next, an operation of the ER mode is described.

The operation sequence in the ER mode is similar to that in the EFCI mode. However, in the ER mode, before an RM cell is transmitted from the source terminal, the desired forward connection transmitting rate such as, for example, the PCR is set on that RM cell. Hence, when the RM cell is transmitted to the node over the forward connection, the node calculates the permissible transmitting rate according to the cell traffic entered into the node. In addition, the node compares the value of the desired forward connection transmitting rate written on the received RM cell with the value of the calculated permissible transmitting rate for the node. When the calculated permissible transmitting rate is smaller than the desired forward connection transmitting rate set on the received cell, the node rewrites the RM cell into the congested status RM cell, and rewrites the forward connection transmitting rate set on the RM cell. Thereafter, the node transfers that RM cell over the forward connection.

By implementing the above-mentioned operation sequentially in the ER mode, the destination terminal receives the RM cell with the maximum possible transmitting rate written thereon. Then, the destination terminal returns that RM cell to the source terminal over the backward connection so as to notify the maximum possible transmitting rate.

The operation principle of the EPRCA in the unicast connection network is as described above.

Next, operations implemented when applying the EPRCA to the multicast connection network are described. FIG. 25 shows an example of the multicast communication. Reference numerals T5 through T8 denote terminals: T5 is the source terminal, and T6 through T8 are destination terminals. In the multi-cast communication, user information is transmitted from the source terminal to a plurality of destination terminals over the forward connection C3f. In a network using the EPRCA, RM cells are transmitted over the forward connection C3f or the backward connection C3b. Referring again to FIG. 25, reference numeral L6 through L11 denote physical transmitting lines. In FIG. 25, the points through which the physical transmitting lines are connected to the nodes are referred to as ports and are indicated by P31, P32, or the like.

Referring to FIG. 25, operations of the EPRCA in the multicast connection network are schematically described.

In accordance with the EPRCA, RM cells are inserted into the user cell stream transmitted from the source terminal T5, as shown in FIG. 23, regardless of whether the network is in the EFCI mode or in the ER mode. The contents of the RM cell are copied in the node N4 and the node N5 and transmitted through the ports therefor in the same way as with user cells. The contents of the RM can be thereby transmitted to all the destination terminals T6 through T8. The process on RM cells to be transmitted over the forward connection in the multicast connection network is implemented in the same way as with the unicast connection network. On the other hand, in the node where backward connections meet (hereinafter referred to as a branching-and-consolidating node, and in the case of FIG. 25 the node N4 and the node N5 are branching-and consolidating nodes), RM cells received through such ports therefor are consolidated into a single RM cell. Then, this consolidated single cell is transmitted through the subsequent physical transmission lines (in the case of FIG. 25, the L7 and L8 are the physical transmission lines). Consequently, likewise in the unicast connection communication, the source terminal receives a number of RM cells which will not exceed the transmitted number of RM cells.

The conventional EPRCA defines the consolidation of RM cells whereby a plurality of RM cells returned to the branching-and-consolidating node through the ports therefor over the backward connection are consolidated into a single RM cell in the multicast connection network. This consolidation process is, however, restricted to the synchronous data transfer mode. Consequently, RM cells returned to the branching-and-consolidated node asynchronously through the ports in different time intervals are not defined in the conventional EPRCA and cannot be actually consolidated into a single RM cell for further transmission.

Consolidation of RM cells into a single RM cell in every branching-and-consolidating node can reduce the RM cell traffic on the subsequent physical transmission line in the upstream direction. However, this consolidation process on RM cells is required in every multiconnection, and this results in a remarkable increase in the data processing load on the branching-and-consolidating nodes.

Furthermore, data transmission flow control in a multicast connection network based on the conventional EPRCA has not been efficiently exercised when distances from a branching-and-consolidating node to next branching-and-consolidating nodes or distances from the branching-and consolidating node to destination terminals are greatly different. In the case of a LAN-WAN-LAN connection network, for example, when a connection from a branching-and-consolidating node to a terminal within the same LAN and another connection from the same branching-and-consolidating node to a remote LAN terminal via the WAN are present, the conventional data transfer flow control has not been efficiently exercised. Also, it is not effective when nodes or terminals differ greatly in the RM cell processing performance thereof. In this case, an RM cell return rate corresponding to the time required for the source terminal to transmit an RM cell over a forward connection and receive the same over a backward connection will fluctuate greatly. Consequently, a speed-up from the ICR at the time of starting cell transmission and a speed-up in the recovery from the congestion state of the network are restricted by the information transmitting rate which has been decreased due to a congestion response occurred.

Furthermore, in some cases, when a multicast tree structure for transmitting information is changed because of the addition to or the reduction of destination terminals, a branching-and-consolidating node nearest to the source terminal for consolidating RM cells over the backward connection must also be modified with the change. However, this modification has not been sufficiently effected.

Furthermore, when branching-and-consolidating nodes are connected in a uni-directional ring network, RM cells over the forward connection and RM cells over the backward connection will be juxtaposed in many parts within the ring, thus resulting in the transmission of superfluous RM cells.

SUMMARY OF THE INVENTION

The present invention has been made to solve the above-mentioned problems. It is, therefore an object of the present invention to obtain stable congestion control in a multicast connection network by defining the processing on RM cells returned to the branching-and-consolidating node over the backward connection.

Further, it is a further object of the present invention to reduce the processing load on the branching-and-consolidating node.

The stable congestion control is also possible when the data transmission system includes a terminal with no data flow control function.

Furthermore, even if a failure has occurred in one of the terminals, normal data flow control is possible between other terminals free from the failure.

It is another object of the present invention to obtain data flow control which allows efficient data transmission between the terminals having a wide bandwidth of radio frequencies.

It is an additional object of the present invention to obtain stable and efficient congestion control of data transmission by defining the processing on RM cells returned to the branching-and-consolidating node over the backward connection in the multicast connection network.

It is a further object of the present invention to obtain a procedure for switching branching-and-consolidating nodes for branching and consolidating RM cells over the backward connection as required when the addition to or reduction of destination terminals is actively effected.

It is another object of the present invention to eliminate the transmission of superfluous RM cells in a uni-directional ring network.

In order to achieve the above-mentioned object, when all the connections are found to be in the uncongested state, only an uncongested status RM cell transmitted to the branching-and-consolidating node last will be transmitted to the destination terminals of the network as a multicast connection status cell. With regard to the uncongested status RM cells transmitted to the branching-and-consolidating node before the above-mentioned uncongested status RM cell, transmission of them will be canceled. On the other hand, when one of the connections of the network is found to be in the congested state, a congested status RM cell transmitted to the branching-and-consolidating node first will be transmitted to the destination terminals as a multicast connection status cell, and the subsequent cell transmission will be canceled at that point.

By exercising the above-mentioned control for each transmission sequence required for data transmission, congestion management is made possible.

Furthermore, when the above-mentioned control is exercised in one of the branching-and-consolidating nodes alone, the processing load on the branching-and-consolidating node for congestion management can be reduced.

In order to enable the above-mentioned operation, a congested status management table should be provided in the branching-and-consolidating node for each port, and congested status management should be performed for RM cells having the same sequence number and returned to the branching-and-consolidating node over the backward connection.

The objects of the present invention are further achieved by providing a multicast connection ATM network system having a multicast connection control apparatus located in a branching-and-consolidating node that connects a port to a source terminal and connects ports to a plurality of destination terminals; for transmitting user cells, RM cells and branching information from the source terminal to the plurality of destination terminals over a forward connection and for consolidating the RM cells asynchronously transmitted from the plurality of destination terminals to the branching-and-consolidating node over a backward connection, the multicast connection control apparatus including: congested status management table means for managing congested status in all RM cells; and a controller for transmitting an uncongested status RM cell from the branching-and-consolidating node to the source terminal over the backward connection after receiving all other uncongested status RM cells having the same sequence number from the plurality of destination terminals; the controller also transmitting a congested status RM cell from the branching-and-consolidating node to the source terminal over the backward connection and stopping a subsequent transmission of the congested status RM cells having the same sequence number as the transmitted congested status RM cell over the backward connection after receiving the congested status RM cell from one of the plurality of destination terminals.

The objects of the present invention are further achieved by providing, in an ER mode, a controller transmitting a congested status RM cell demanding a lower transmission rate to the source terminal when detecting a congested status in the forward connection.

The objects of the present invention are further achieved by providing the controller with the function of transmitting the congested status RM cell to the source terminal when detecting a failure of reception of the uncongested status RM cell in the sequence, and thereafter stopping a response to the source terminal in the sequence.

The objects of the present invention are further achieved by providing the controller with the function of transmitting the congested status RM cell to the source terminal when failing to receive the uncongested status RM cell within a specific period of time, and thereafter stopping a response to the source terminal in the sequence.

The objects of the present invention are further achieved by providing the controller with the function of transmitting the congested status RM cell to the source terminal when failing to receive the uncongested status RM cell within the specific period of time wherein the specific period of time is determined by a distance and a number of nodes between the branching-and-consolidating node and the destination terminal.

The objects of the present invention are further achieved by providing the multicast connection control apparatus in a specific node.

The objects of the present invention are further achieved by providing the multicast connection control apparatus in a branching-and-consolidating node nearest to the source terminal.

The objects of the present invention are further achieved by providing the controller with the function of controlling a congestion response when a number of forward connections from the source terminal exceeds a specific value.

The objects of the present invention are further achieved by providing the controller with the function of controlling the congestion response when a sum of PCRs from the source terminal exceeds a specific value.

The objects of the present invention are further achieved by having the branching-and-consolidating node receive a signaling procedure from the source terminal which is used by the controller to control the congested status RM cell.

The objects of the present invention are further achieved by providing the controller with the function of controlling a troubled destination terminal until the troubled destination terminal has recovered.

The objects of the present invention are further achieved by having a node transmit an operation and maintenance cell over the backward connection for identifying the troubled destination terminal.

The objects of the present invention are further achieved by providing the controller with the function of transmitting the uncongested status RM cell over the backward connection when an uncongested status is detected in a specific port for a specific period of time.

The objects of the present invention are further achieved by including a selected node bordering a first control segment and a second control segment, the selected node in the first control segment responding as a virtual destination terminal instead of a selected destination terminal, and the selected node in the second control segment controlling a congested status in the second control segment including the selected destination terminal.

The objects of the present invention are further achieved by providing the selected node with an ICR for the second control segment different from the ICR for the first control segment.

The objects of the present invention are further achieved by providing the controller with the function of transmitting an informing RM cell indicating a control status of the branching-and-consolidating node to a subsequent node.

The objects of the present invention are further achieved by providing the controller with the function of transmitting a second informing RM cell indicating that the multicast connection control apparatus will continue control of the backward connection when failing to receive an acceptance from another node.

The objects of the present invention are further achieved by providing a unidirectional ring network including ring nodes for writing the congested status of the forward connection into a subsequent RM cell.

The objects of the present invention are further achieved by providing one of the ring nodes with the function of transmitting an RM cell having the congested status information as to the forward connection to a destination terminal therefor, and transmits an RM cell having previous congested status information as to the destination terminal therefor to a subsequent ring node in the ring network.

The objects of the present invention are further achieved by providing a method of controlling a branching-and-consolidating node that connects a port to a source terminal and connects ports to a plurality of destination terminals in a multicast connection ATM network, the method including the steps of transmitting user cells and RM cells including branching information from the source terminal to the plurality of destination terminals over a forward connection; asynchronously transmitting uncongested status RM cells and/or congested status RM cells from the plurality of destination terminals to the branching-and-consolidating node over a backward connection; consolidating the RM cells asynchronously transmitted from the plurality of destination terminals; managing congested status in all RM cells with a plurality of congested status management tables, wherein each port is managed by a corresponding one of the congested status management tables; transmitting the uncongested status RM cell from the branching-and-consolidating node to the source terminal over the backward connection after receiving all other uncongested RM cells having the same sequence number from the plurality of destination terminals; and transmitting the congested status RM cell and stopping a subsequent transmission of the congested status RM cells having the same sequence number as the transmitted congested status RM cell from the branching-and-consolidating node to the source terminal over the backward connection after receiving the congested status RM cell from one of the plurality of destination terminals.

The objects of the present invention are further achieved by providing the managing step with the substeps of updating a corresponding one of the congested status management tables when the branching-and-consolidating node receives the RM cell from a respective destination terminal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE DRAWINGS

The invention will be better understood by reference to the detailed description which follows and the accompanying drawings which are given by way of illustration only, and thus are not limitative of the present invention, and wherein:

FIG. 15 is a block diagram showing a data transmission system in which a control segment is divided into a plurality of control segments for implementing congested status management independently;

Figure 21:
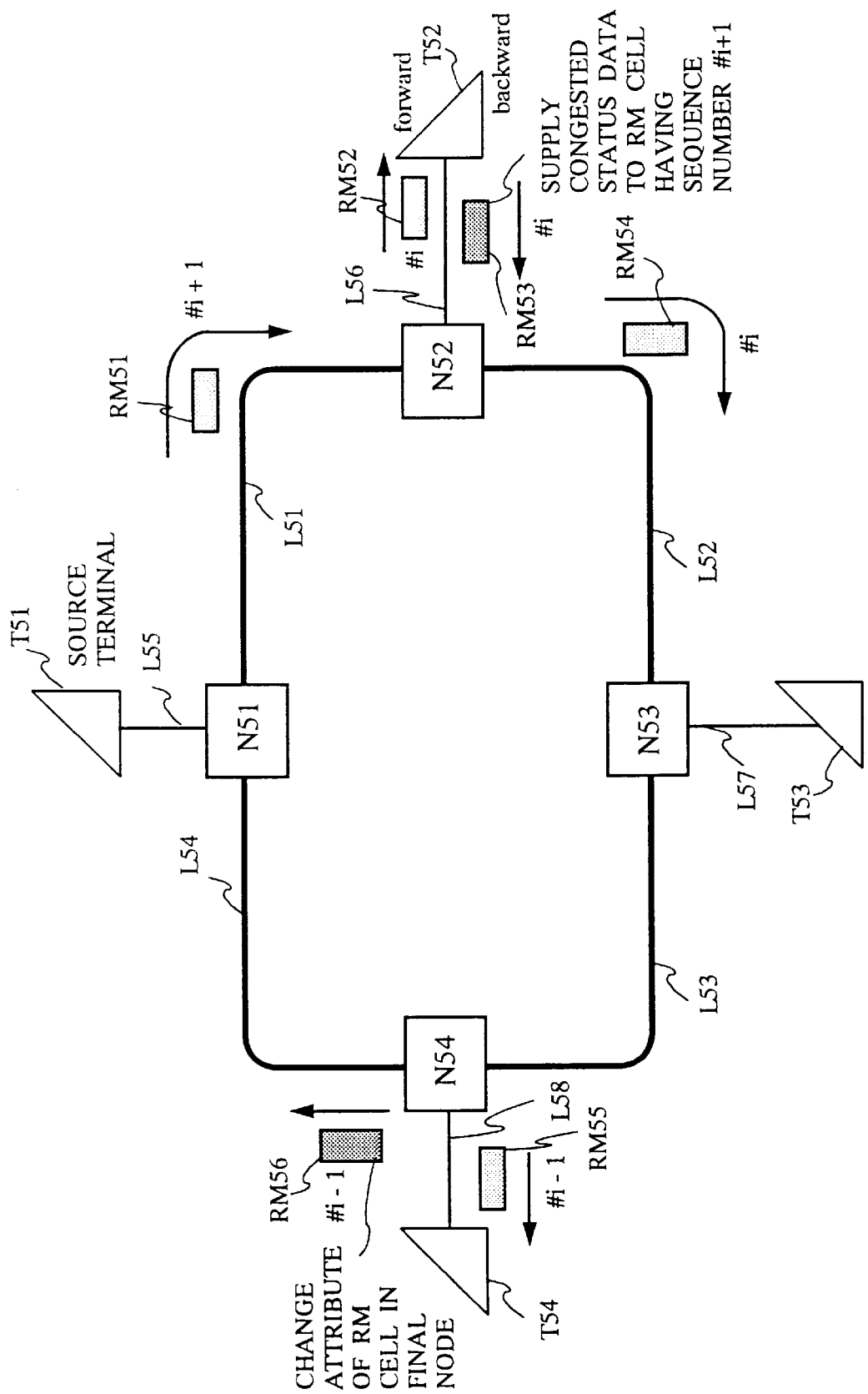
Figure 22:
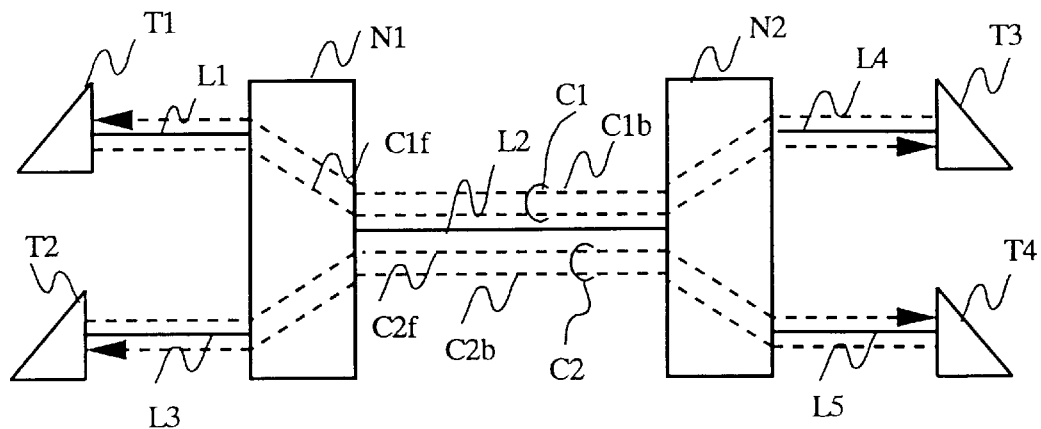

FIG. 20A, FIG. 20B, FIG. 20C, and FIG. 20D are flow charts showing control operations required for the switching of the branching-and-consolidating node for consolidating RM cells according to the tenth embodiment of the present invention;

FIG. 21 is a block diagram showing a unidirectional ring network and RM cells transmitted therein according to the eleventh embodiment of the present invention;

FIG. 22 is a block diagram showing communication implemented in a conventional unicast connection network.

Figure 23:
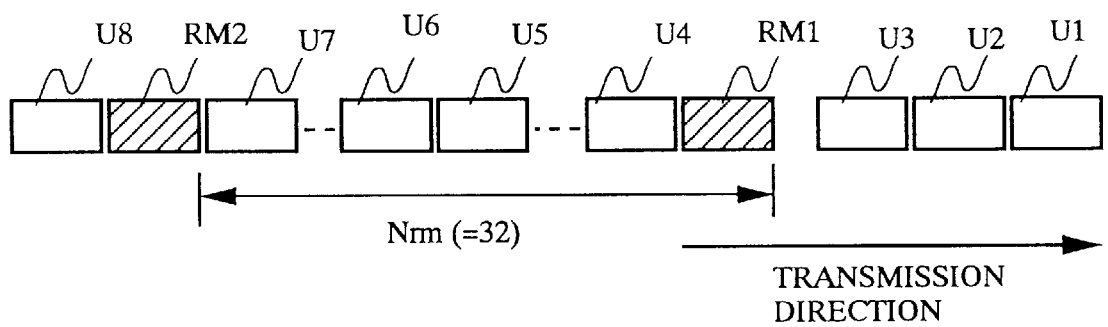
Figure 24:
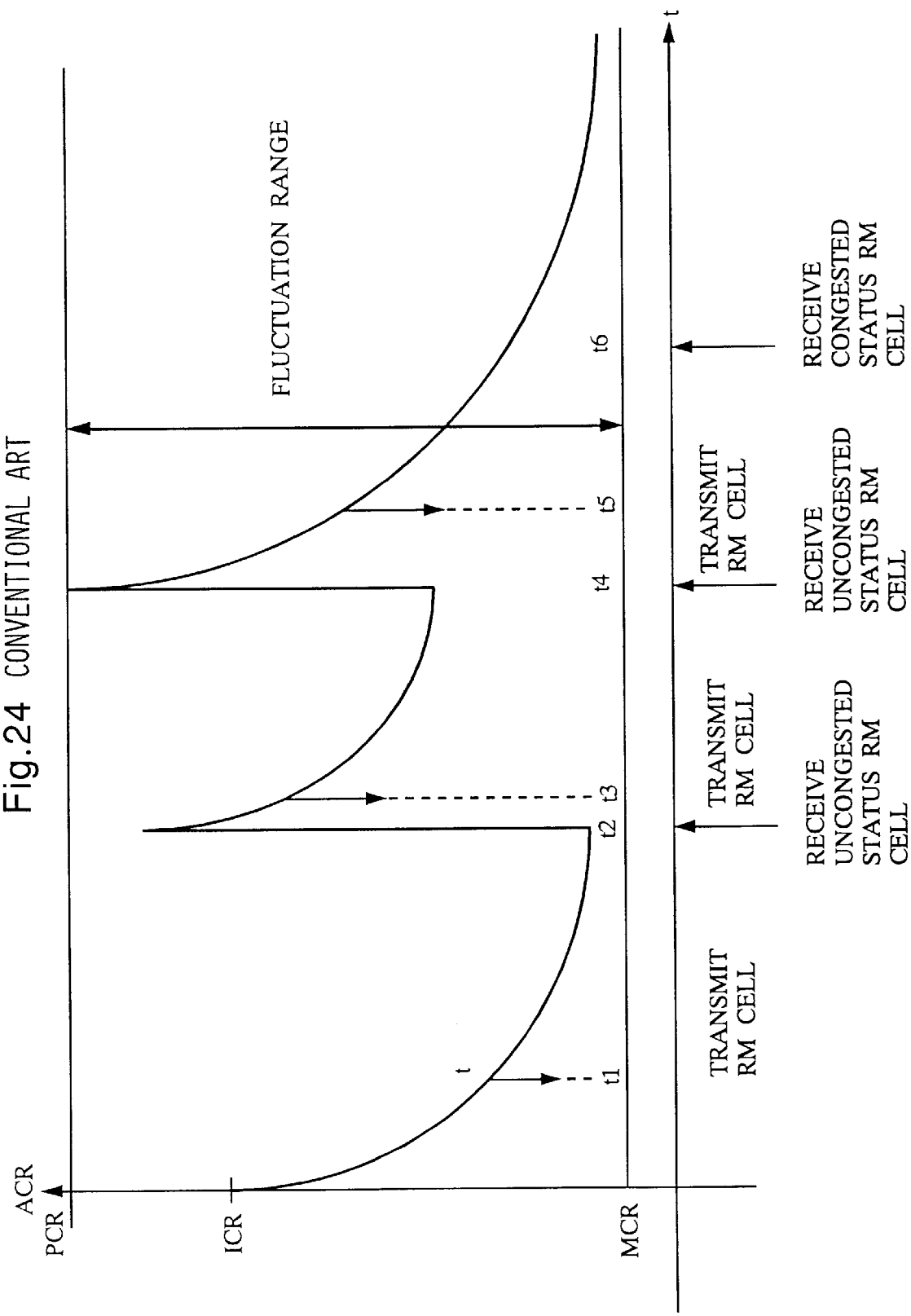
Figure 25:
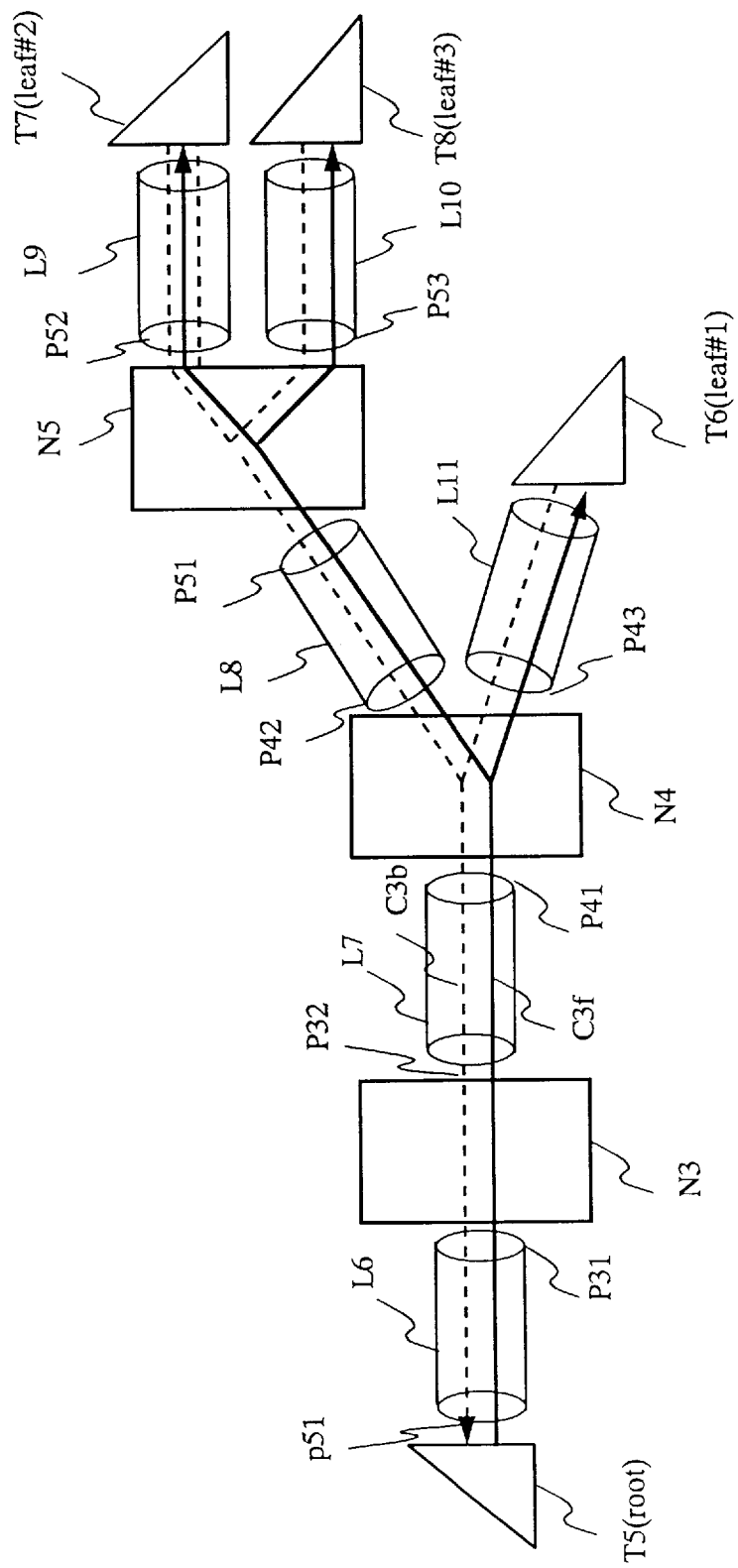

FIG. 23 is a block diagram showing a conventional transmission timing of RM cells over the forward connection in accordance with the EPRCA;

FIG. 24 is a graph showing a state where the forward connection transmitting rate is controlled in accordance with the EPRCA; and FIG. 25 is a block diagram showing communication implemented in the conventional multicast connection network.

DETAILED DESCRIPTION OF PREFERRED EMBODIMENTS

First Embodiment

FIG. 1 includes a block diagram showing communication between a branching-and-consolidating node and destination terminals, and timing charts showing transmission sequences of RM cells using the branching-and-consolidating node and the destination terminals illustrated above (a) of FIG. 1.

Figure 1:
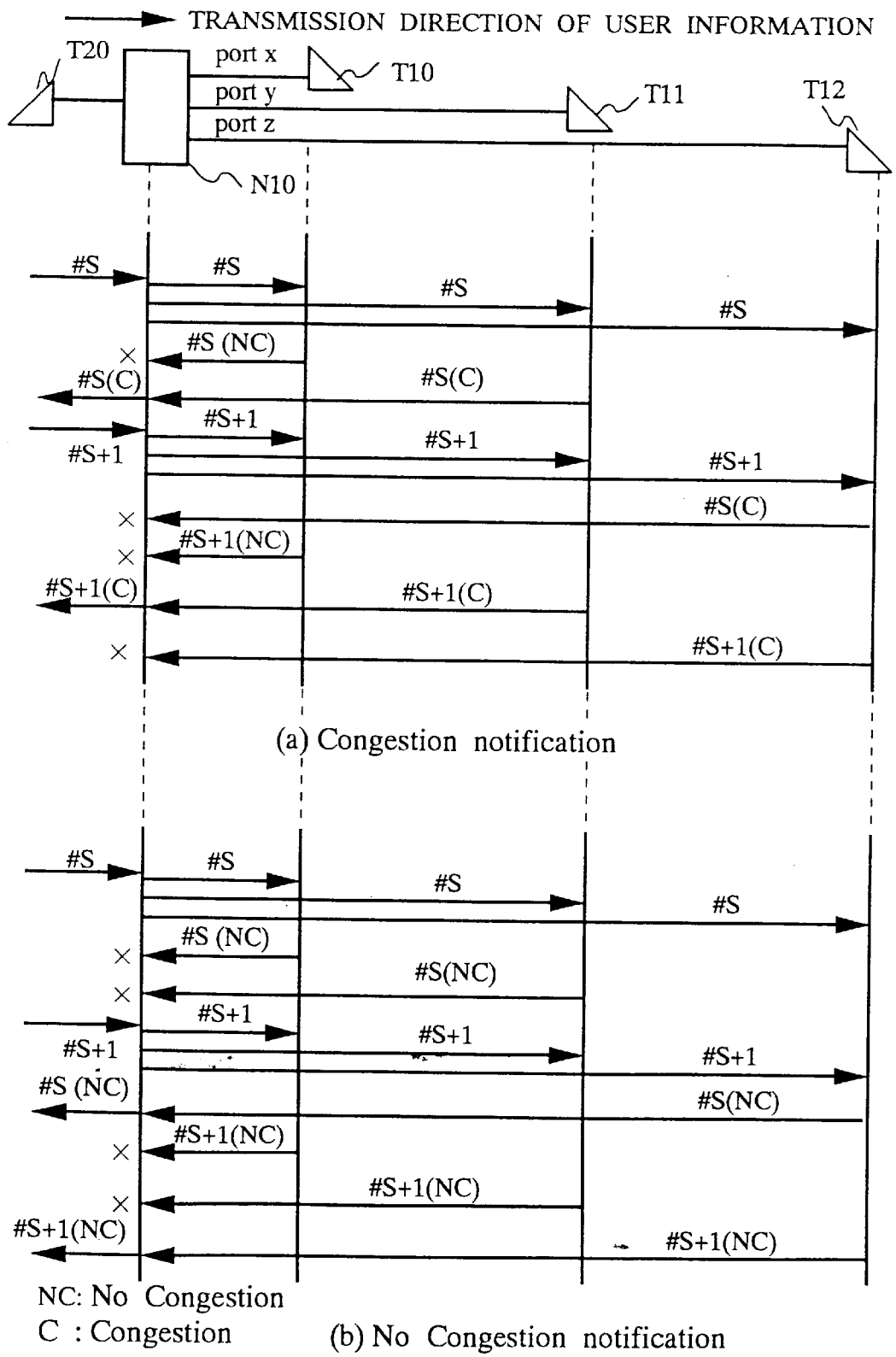
FIG. 1 is a combination drawing showing a block diagram and timing charts that respectively describe transmission sequences of RM cells according to the first embodiment of the present invention.

Referring to FIG. 1, reference numeral N10 denotes the branching-and-consolidating node for consolidating RM cells. Reference numeral T20 denotes the source terminal, and reference numerals T10, T11, and T12 denote destination terminals. In the block diagram of FIG. 1, the ports indicated by x, y, and z are physical transmission ports for connecting the branching-and-consolidating node N10 to the destination terminals T10, T11, and T12, respectively. In the timing charts of FIG. 1, reference numerals #S and #S+1 denote sequence numbers assigned to RM cells. Arrows show the directions of the RM cell transmission stream, and (C) and (NC) show the congested state and the uncongested state of the network, respectively.

Figure 2:
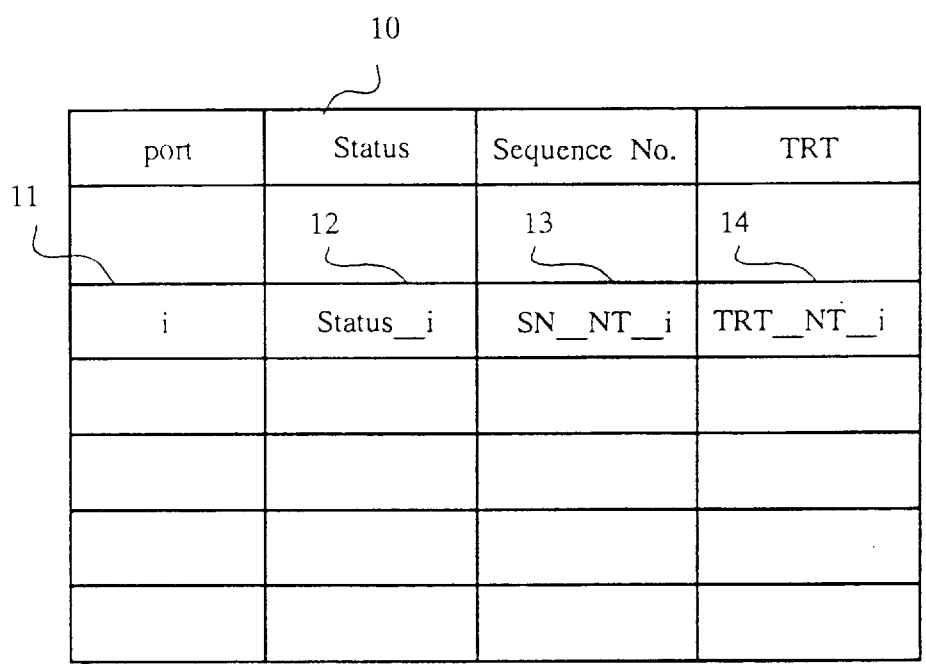
FIG. 2 is a congested status management table in the branching-and-consolidating node for managing the congested states of ports provided in each multicast connection.

FIG. 2 is a table indicated by reference numeral 10 (hereinafter referred to as a congested status management table or just a management table) in the branching-and-consolidation node for managing the congested states of ports provided in each multicast connection.

In FIG. 2, TRT stands for Target Return Time showing the time at which an RM cell to be next returned to the branching-and-consolidating node over the backward connection will be returned thereto.

Figure 3:
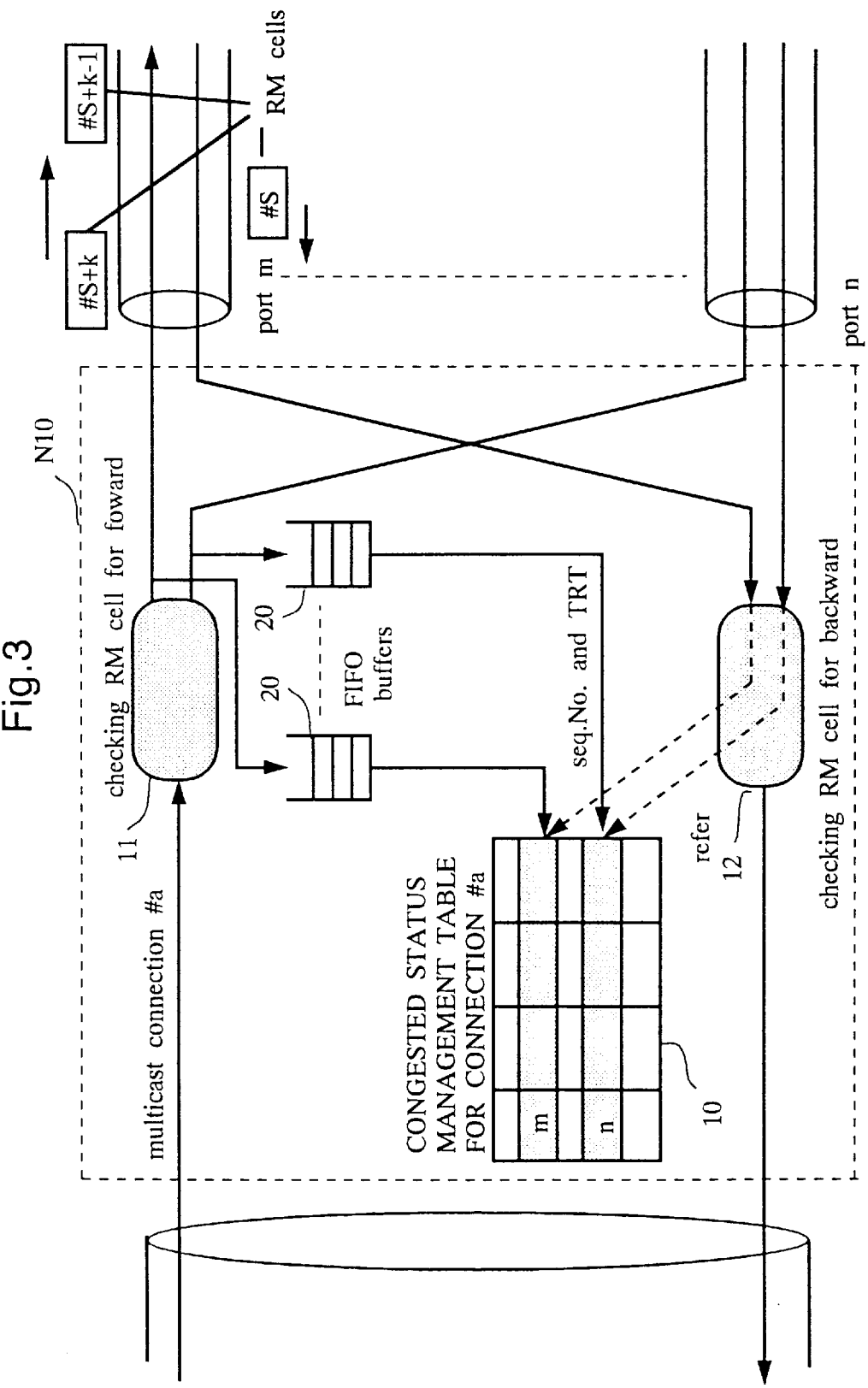
FIG. 3 is a block diagram showing a structure of the branching-and-consolidating node for consolidating RM cells according to the first embodiment of the present invention.

FIG. 3 is a block diagram showing a structure of a branching-and-consolidating node according to the first embodiment of the present invention showing how the consolidation of RM cells is implemented therein. The branching-and-consolidation node N10 includes a branching unit 11 for branching RM cells, a consolidation unit 12 for consolidating RM cells, and First-In-First Out (FIFO) buffers 20. The branching unit 11 supplies to the management table 10 or the FIFO buffers 20 the sequence numbers of RM cells received over the forward connection and the time at which the RM cells will be returned to the branching-and-consolidating node over the backward connection.

Figure 4:
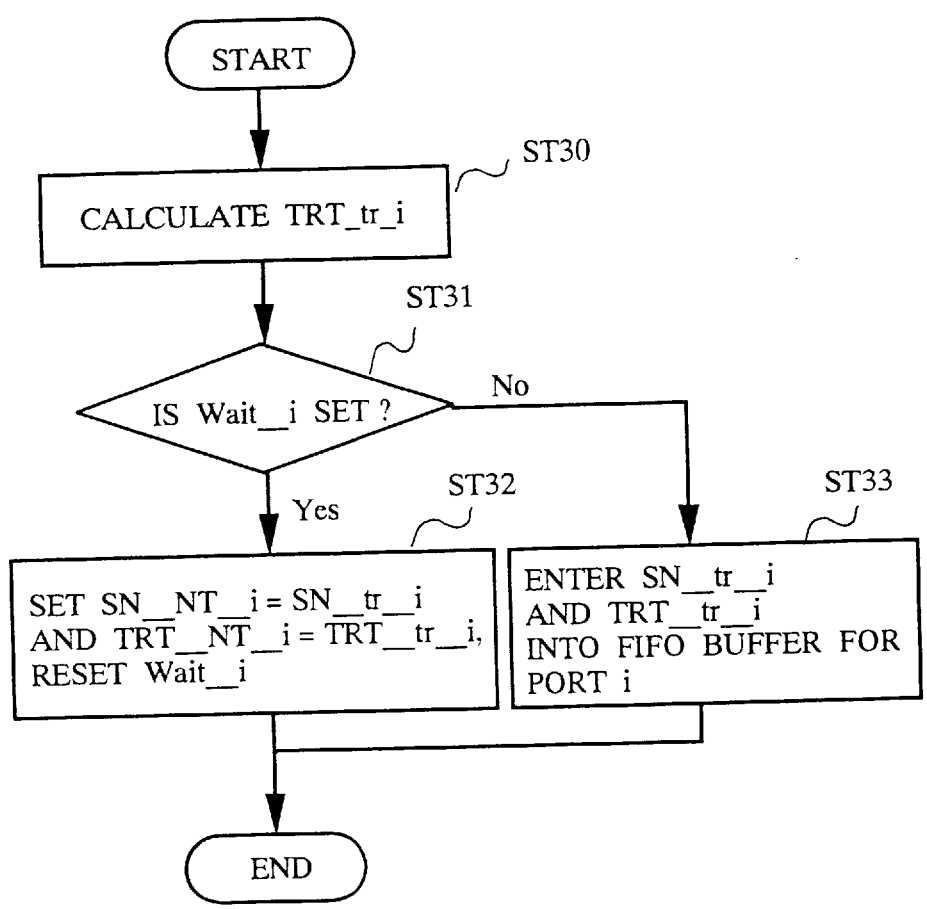
FIG. 4 is a flow chart showing an operation flow of the branching-and-consolidating node for implementing the processing on the RM cells transmitted thereto over the forward connection in the EFCI mode.
Figure 5:
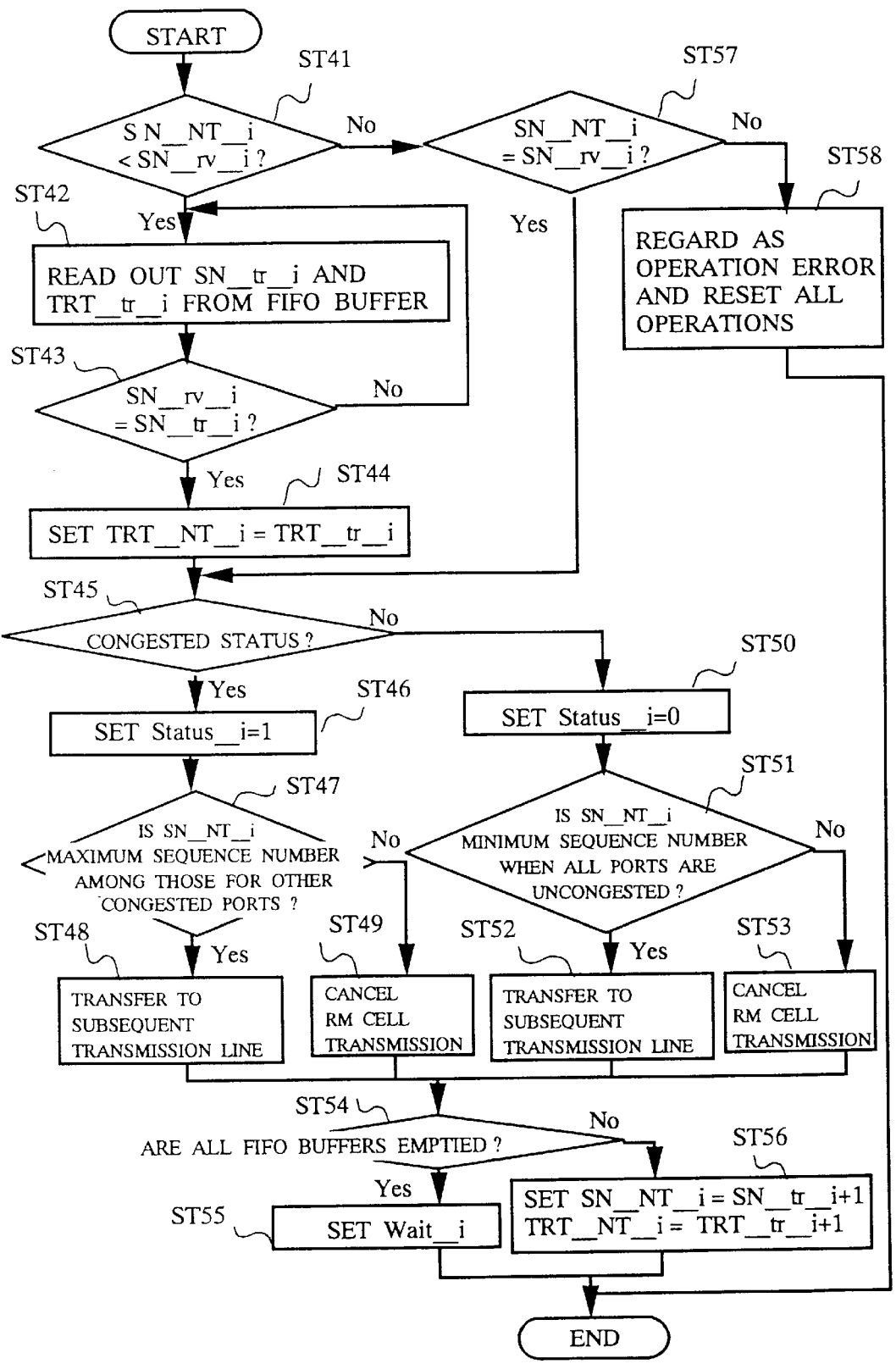
FIG. 5 is a flow chart showing an operation flow of the branching-and-consolidating node for implementing the processing on the RM cells transmitted thereto over the backward connection in the EFCI mode.
Figure 6:
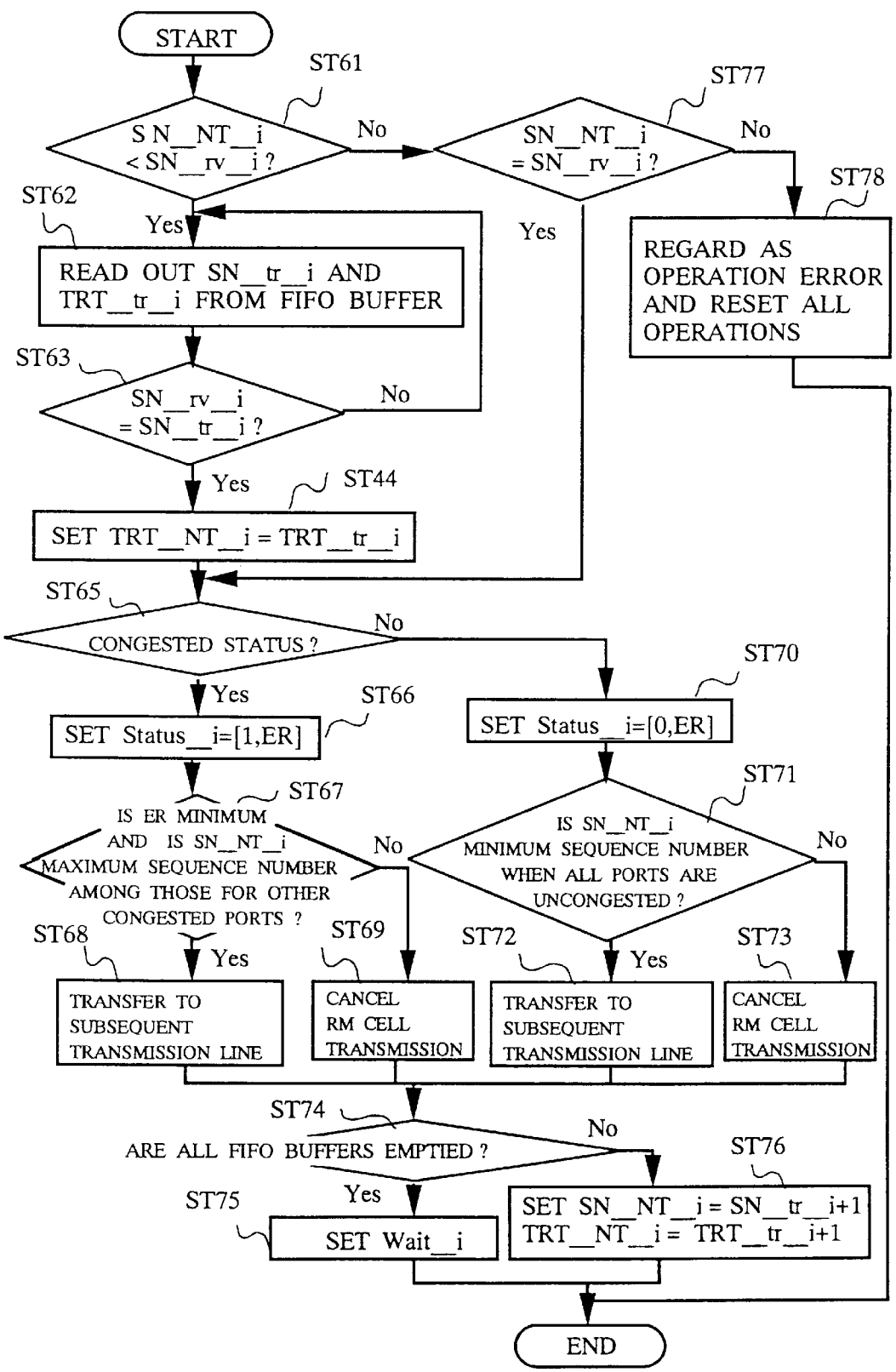
FIG. 6 is a flow chart showing an operation flow of the branching-and-consolidating node for implementing the processing on the RM cells transmitted thereto over the backward connection in the ER mode.

FIGS. 4 through 6 are flow charts showing an operation flow of the branching-and-consolidating node for consolidating RM cells.

FIGS. 7 through 10 are graphs, diagrams, and congested status management tables for showing a typical operation of the branching-and-consolidating node N10 illustrated in FIG. 1.

In FIGS. 7 through 10, reference numeral 100 denotes a forward connection transmitting rate curve from, for example, the source terminal T20 illustrated in FIG. 1. Reference numerals 101a and 101b show RM cells transmitted to the branching-and-consolidating node over the forward connection, and 102a and 102b respectively show RM cells transferred to each port from the branching-and-consolidating node over the forward connection. Furthermore, reference numerals 103a and 103b show RM cells returned to the branching-and-consolidating node over the backward connection, and 104a shows an RM cell transmitted from the branching-and-consolidating node onto the physical transmission line in the upstream direction.

This first embodiment of the present invention aims to enable congestion control in a multicast connection network. In order to achieve the above-mentioned object, when all the connections are found to be in the uncongested state, only an uncongested status RM cell transmitted to the branching-and-consolidating node last will be transmitted to the destination terminals of the network as a multicast connection status cell. With regard to the uncongested status RM cells transmitted to the branching-and-consolidating node before the above-mentioned uncongested status RM cell, transmission of them will be canceled. On the other hand, when one of the connections of the network is found to be in the congested state, a congested status RM cell transmitted to the branching-and-consolidating node first will be transmitted to the destination terminals as a multicast connection status cell, and the subsequent congested status RM cell transmission will be canceled at that point.

By exercising the above-mentioned control for each transmission sequence required for data transmission, congestion management is made possible.

Furthermore, when the above-mentioned control is exercised in one of the branching-and-consolidating nodes alone, the processing load on the branching-and-consolidating node for congestion management can be reduced.

An operation of the above-mentioned congestion control will be described, by referring to the drawings.

In FIG. 1, (a) and (b) are timing charts showing a basic transmission sequence of RM cells according to the first embodiment of the present invention. As shown in (a) of FIG. 1, RM cells having the sequence number #S are transmitted from the branching-and-consolidating node to the destination terminals over the forward connection and then returned over the backward connection. When the branching-and-consolidating node has received the congested status RM cells having the sequence number #S over the backward connection, only the RM cell having the same sequence number #S and that has been returned to the branching-and-consolidating node fist will be transmitted further onto the subsequent physical transmission line. Then, the transmission of congested status RM cells having the sequence number #S is stopped thereafter. Furthermore, as shown in (b) of FIG. 1, when the branching-and-consolidating node has received uncongested status RM cells having the same sequence number from all the ports over the backward connection, only the uncongested status RM cell having the same sequence number and that has been returned thereto last will be transmitted further onto the subsequent physical transmission line.

In order to enable the above-mentioned operation, a congested status management table should be provided in the branching-and-consolidating node for each port, and congested status management should be performed for RM cells having the same sequence number and returned to the branching-and-consolidating node over the backward connection. In this case, installment of FIFO buffers 20 illustrated in FIG. 3 will facilitate congested status management to be exercised in the branching-and-consolidating node.

Next, referring to FIGS. 2 through 6, the above-mentioned operations will be described in detail in terms of the processing on an RM cell transmitted over the forward connection, the processing on an RM cell transmitted over the backward connection, and the processing required for updating the congested status management table. The branching-and-consolidating node N10 illustrated in FIG. 3 includes a controller for performing the above-mentioned operation illustrated in FIGS. 4 through 6.

A) EFCI Mode

First, the above-mentioned operations to be performed in the EFCI mode are described. The following variables will be used:

Status_i: a congested status storage area of a port i, indicated by reference numeral 12 in FIG. 2 in the congested status management table 10 provided in the branching-and-consolidating node N10. Referring to FIG. 1, the physical connection between the destination terminal T10 and the branching-and-consolidating node N10, the physical connection between the destination terminal T11 and the branching-and-consolidating node N10, and the physical connection between the destination terminal T12 and the branching-and-consolidating node N10 are represented by the port x, port y, and port z, respectively.

SN_NT_i: the sequence number of an RM cell to be next returned to the port i over the backward connection, which is indicated by reference numeral 13 in FIG. 2. Referring to FIG. 1, the sequence numbers of RM cells to be transmitted from the destination terminals T10, T11, and T12 to the branching-and-consolidating node N10 are indicated by #S and #S+1.

TRT_NT_i: the time at which the RM cell having the sequence number SN_NT_i will be returned to the port i over the backward connection, which is indicated by reference numeral 14 in FIG. 2.

SN_tr_i: the sequence number of an RM cell transmitted to the port i over the forward connection.

TRT_tr_i: the time at which the RM cell having the sequence number SN_tr_i transmitted to the port i over the forward connection will be returned to the port i over the backward connection.

SN_rv_i: the sequence number of an RM cell actually returned to the port i over the backward connection.

Furthermore, a flag represented by Wait_i provided in the port i will also be used. The flag represented by Wait_i indicates either the condition in which an RM cell or RM cell data is stored in the FIFO buffer 20 or the condition in which the RM cell data is directly written into the congested status management table. When the flag is set, it indicates that the RM cell data will be directly written into the congested status management table. Once the RM cell data is written into the congested status management table, the flag will be reset. Then, a response from each port over the backward connection will be awaited. When an RM cell or RM cell data is in the FIFO buffer 20 provided for each port illustrated in FIG. 3, the flag represented by Wait_i will be reset. It means that the flag will be reset during the time for the branching-and-consolidating node to implement the processing on the RM cells transmitted over the forward connection and to receive the response from all the ports therefor which have received the same RM cells over the backward connection.

A-(1): The Processing On An RM Cell Transmitted To The Branching-And-Consolidating Node Over The Forward Connection.

When the branching-and-consolidating node has received an RM cell over the forward connection, the controller in the node will execute the following operations for each port receiving the RM cell. The operations will be described by referring to FIG. 4. It is assumed herein that the RM cell will be transmitted to the port i from the branching-and-consolidating node over the forward connection.

First, at step 30 (hereinafter abbreviated as ST30), TRT_tr_i is calculated based on the moving average taken from a succession of monitored averages of the time required for all ports to transmit an RM cell therefrom over the forward connection and receive the same over the backward connection.

If it has been found that the flag Wait_i is in the set state or if it has been found that an RM cell is not stored in the FIFO buffer 20 at ST31, the following setting operation will be performed at ST32:

SN_NT_i is set to SN_Tr_i.
TRT_NT_i is set to TRT_tr_i.
Then, the flag Wait_i is reset.

If it has been found that the flag Wait_i is not in the set state, SN_tr_i and TRT_tr_i are supplied to the FIFO buffer for the port i at ST33.

A-(2): The Processing On An RM cell Returned To The Branching-And-Consolidating Node Over The Backward Connection.

When the branching-and-consolidating node has received an RM cell over the backward connection, the controller in the node will execute the following operations for the port from which the RM cell has been transmitted. The operations will be described in the case of the port i, by referring to FIG. 5.

If it has been found at ST41 that SN_rv_i is greater than SN_NT_i or when the expected value and the measured value of the RM cell sequence number differ due to, for example, a cell transmission loss in the network, SN_tr_i and TRT_tr_i are read out from the FIFO buffer 20 for the port i until SN_rv_i becomes equal to SN_tr_i or until the expected value and the measured value of the RM cell sequence number becomes equal.

Then, at ST44, TRT_NT_i and TRT_tr_i are set to be equal.

At ST45, it is determined whether the received RM cell is the congested status RM cell or the uncongested status RM cell.

a) If the received RM cell is the congested status RM cell, then Status_i of the port i is set to "1" at ST46, and the following operations will be executed during subsequent steps:

If SN_NT_i is the maximum among the sequence numbers assigned to congested status RM cells to be next returned to other ports over the backward connection, or if the sequence number of the congested status RM cells to be next returned to other ports is #S and the sequence number of the RM cell to be next returned to the port i is #S+1, for example, the RM cell having the maximum sequence number or #S+1 will be transferred onto the subsequent physical transmission line.

If SN_NT_i is not the maximum, the transmission of the RM cell to be next returned to the port i will be canceled.

b) If the received RM cell is the uncongested status RM cell, then Status_i is set to "0".

Then, if all ports indicate the uncongested state and SN_NT_i is the minimum among the sequence numbers of RM cells to be next returned to other ports, or if all ports indicate the uncongested state and the sequence number of the RM cells to be next returned to other ports and the sequence number of the RM cell to be next returned to the port i are the same #S, the RM cell having the sequence number #S will be transferred onto the subsequent physical transmission line.

If SN_NT_i is not the minimum, the transmission of RM cell will be canceled.

When the port i receives an RM cell over the backward connection, the data on the RM cell is read out from the FIFO buffer 20. After the above-mentioned operations are executed and all the FIFO buffers 20 for individual ports are then emptied, Wait_i is set.

Otherwise, the following setting operation will be executed at ST56.

SN_NT_i is set to SN_tr_i+1.
TRT_NT_i is set to TRT_tr_i+1. Then, RM cell data corresponding thereto is deleted from the FIFO buffer 20.

If it has been found that SN_NTi is equal to SN_rv_i or if it has been found that the expected value and the measured value of the RM cell sequence number are equal at ST57, the operations from ST45 through ST56 will be executed.

If it has been found that SN_NT_i is greater than SN_rv_i at ST41 and ST57, it is determined that an abnormality has occurred in the operations of the network. Then, at ST58, it is regarded as an operation sequence error, and all the operations will be reset.

A-(3): The Processing Required For Updating The Congested Status Management Table.

In order to implement the above-mentioned processing, the controller in the node will execute the following operation for each port asynchronously with the RM cell transmission to each of the ports. It is checked whether TRT_NT_i is past the current time. If TRT_NT_i is past the current time, the network is determined to be in the congested state. Consequently, Status_i for the port i is set to "1".

B) ER Mode.

Now, the operations to be executed in the ER mode will be described.

In the ER mode, the congested status storage area Status_i is expressed with a vector having two variables: Status_i_Congestion represents the congested state or the uncongested state of the port i and Status_i_Rate represents the allowed transmitting rate of the port i as follows:

Status_i=[Status_i_Congestion, Status_i_Rate]

In the ER mode, the operations to be executed for the above-mentioned A-(2) and A-(3) processing are different from those in the EFCI mode. Next, the operations which are different from those for the A-(2) and A-(3) processing will be described.

B-(2): The Processing On An RM Cell Returned To The Branching-And-Consolidating Node Over The Backward Connection.

When the branching-and-consolidating node has received an RM cell over the backward connection, the controller in the node will execute the following operations for the port to which the RM cell has been transmitted. Herein, the operation performed for the port i will be described, by referring to FIG. 6.

If it has been found that SN_rv_i is greater than SN_NT_i at ST61, SN_tr_i and TRT_tr_i are read out from the FIFO buffer 20 for the port i until SN_rv_i becomes equal to SN_tr_i, or until the expected value and the measured value of the RM cell sequence number becomes equal, as in the EFCI mode.

Then, at ST63, TRT_NT_i is set to TRT_tr_i.

Then, at ST65, it is determined whether the received RM cell is the congested status RM cell or the uncongested status RM cell.

a) If the received RM cell is the congested status RM cell, Status_i of the port i is set to "1", and to ER which is an allowed transmitting rate is set in the source terminal.

If ER is the minimum due to the congestion in the port i, and if SN_NT_i is the maximum among the sequence numbers assigned to congested status RM cells to be next returned to other ports over the backward connection, the RM cell indicating such conditions will be transferred onto the subsequent physical transmission line.

If ER is not the minimum, and if SN_NT_i is not the maximum, the transmission of the RM cell indicating such conditions will be canceled.

b) If the received RM cell is the uncongested status RM cell, then Status_i is set to "0", and to ER which will remain unchanged because it has been set in the source terminal.

Then, if SN_NT_i is the minimum among the sequence numbers of RM cells to be next returned to other ports, or when the sequence number of the RM cells to be next returned to other ports and the sequence number of the RM cell to be next returned to the port i are the same, the RM cell indicating the above-mentioned condition will be transferred onto the subsequent physical transmission line.

If SN_NT_i is not the minimum, the transmission of the RM cell indicating this condition will be canceled.

After the above-mentioned operation is executed and all the FIFO buffers 20 are emptied, Wait_i is set.

If all the FIFO buffers 20 are not emptied, the following setting operations will be executed at ST76:

SN_NT_i is set to SN_tr_i+1.

TRT_NT_i is set to TRT_tr_i+1.

If it has been found that SN_NT_i is equal to SN_rv_i at ST77, the operations from ST65 through ST76 will be executed.

If it has been found that SN_NT_i is greater than SN_rv_i at ST61 and ST77, it is determined that an abnormality has occurred in the operations of the network. Since it is regarded as an operation sequence error, all the operations will be reset.

B-(3):The Processing Required For Updating The Congested Status Management Table.

In order to implement the above-mentioned processing, the controller in the node will execute the following operation for each port asynchronously with the RM cell transmission to each of the ports.

It is checked whether TRT_NT_i is past the current time. If TRT_NT_i is past the current time, the network is determined to be in the congested state. Consequently, Status_i_Congestion in Status_i for the port i is set to "1".

A typical operation of the branching-and-consolidating node illustrated in FIG. 3 for consolidating RM cells in the EFCI mode in conjunction with the above-mentioned processing on an RM cell will be described, by referring to FIGS. 7 through FIG. 10.

Figure 7:
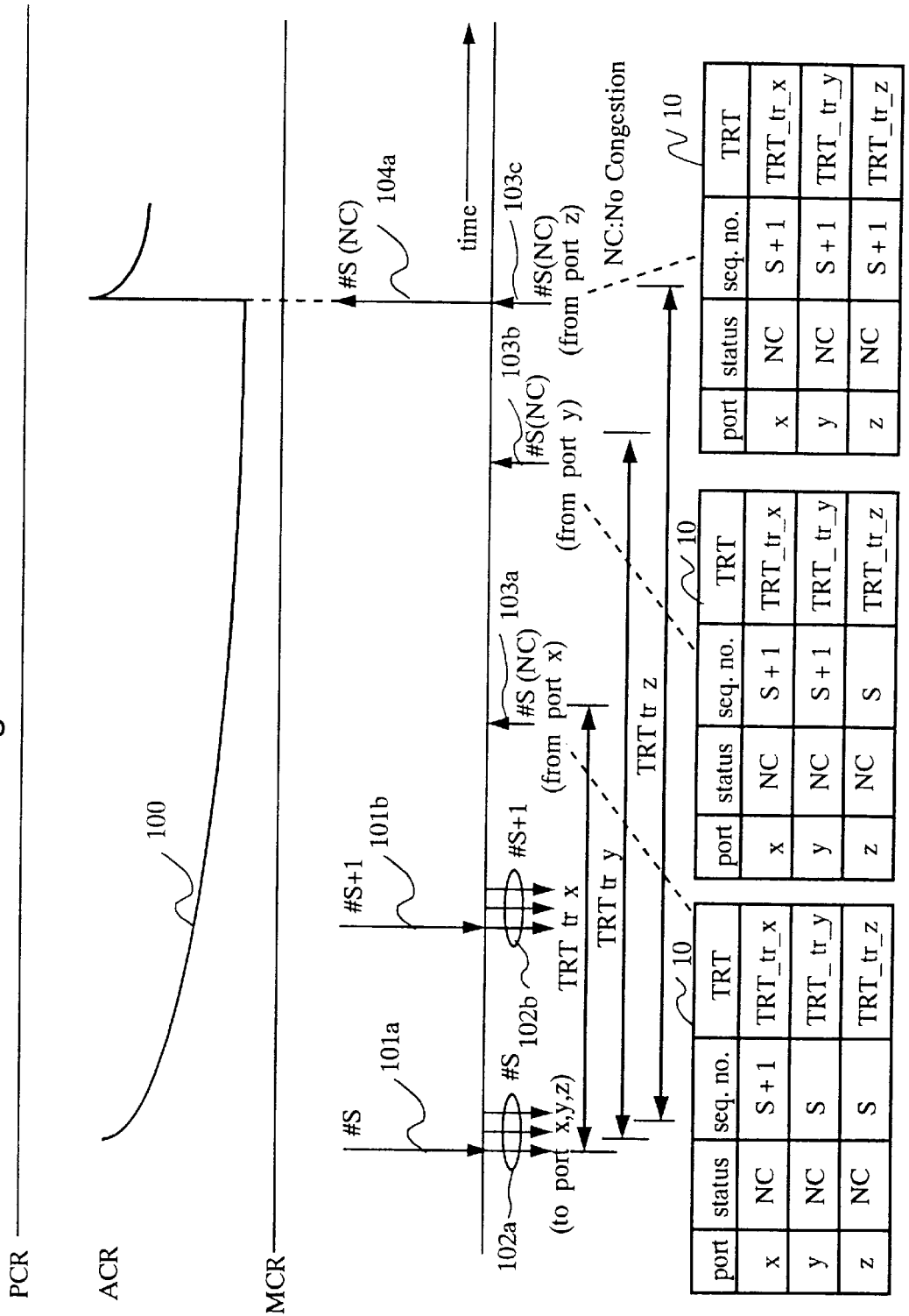
FIG. 7 is a combination drawing showing a graph, a diagram, and congested status management tables that describe an operation of the branching-and-consolidating node for implementing the processing on the uncongested status RM cells, according to the first embodiment of the present invention.
Figure 8:
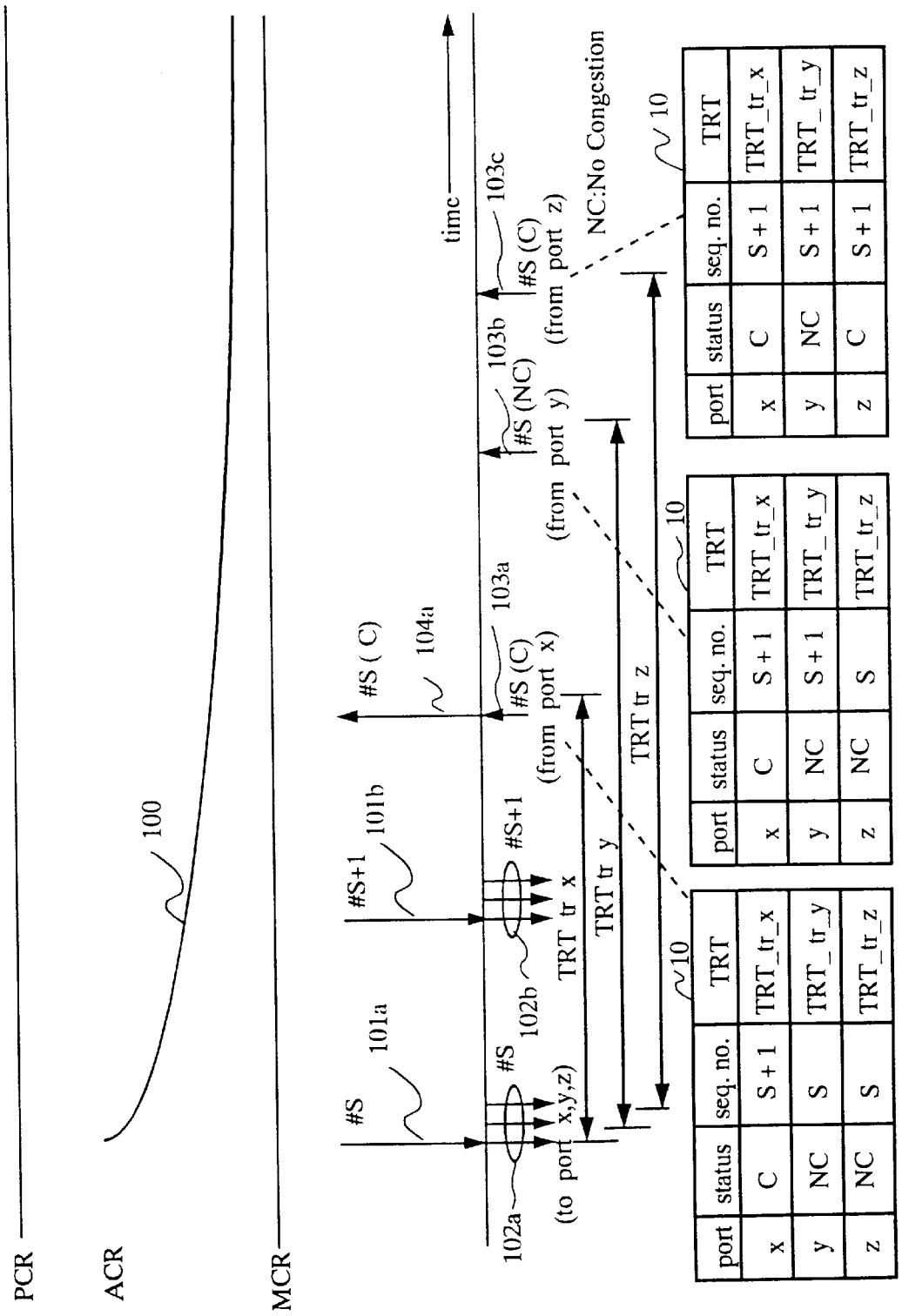
FIG. 8 is a combination drawing showing a graph, a diagram, and congested status management tables that describe an operation of the branching-and-consolidating node for implementing the processing on RM cells when congestion has occurred on the network, according to the first embodiment of the present invention.
Figure 9:
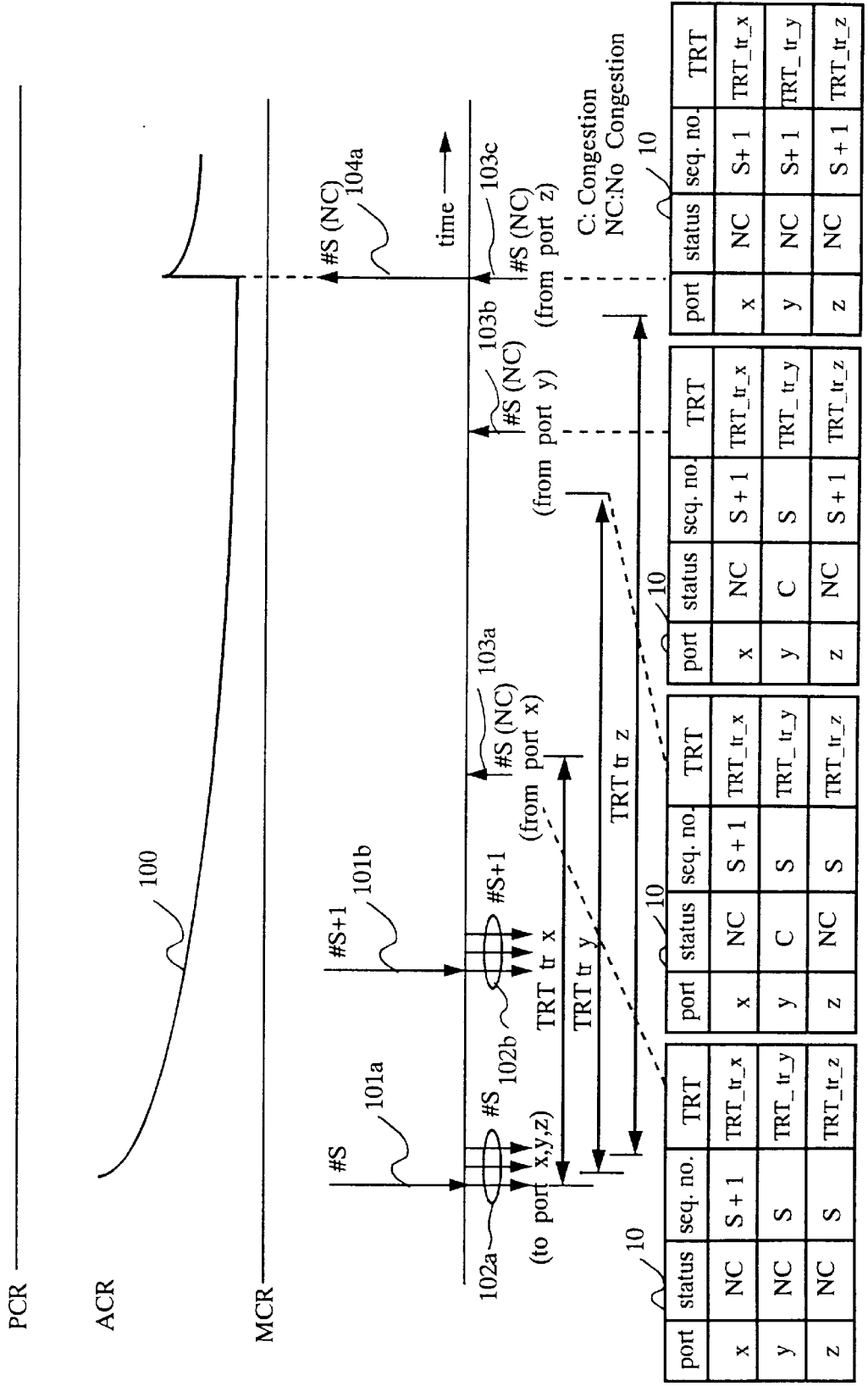
FIG. 9 is a combination drawing showing a graph, a diagram, and congested status management tables that describe an operation of the branching-and-consolidating node when an RM cell transmitted over the backward connection has not been returned thereto within a predetermined period of time, according to the first embodiment of the present invention.
Figure 10:
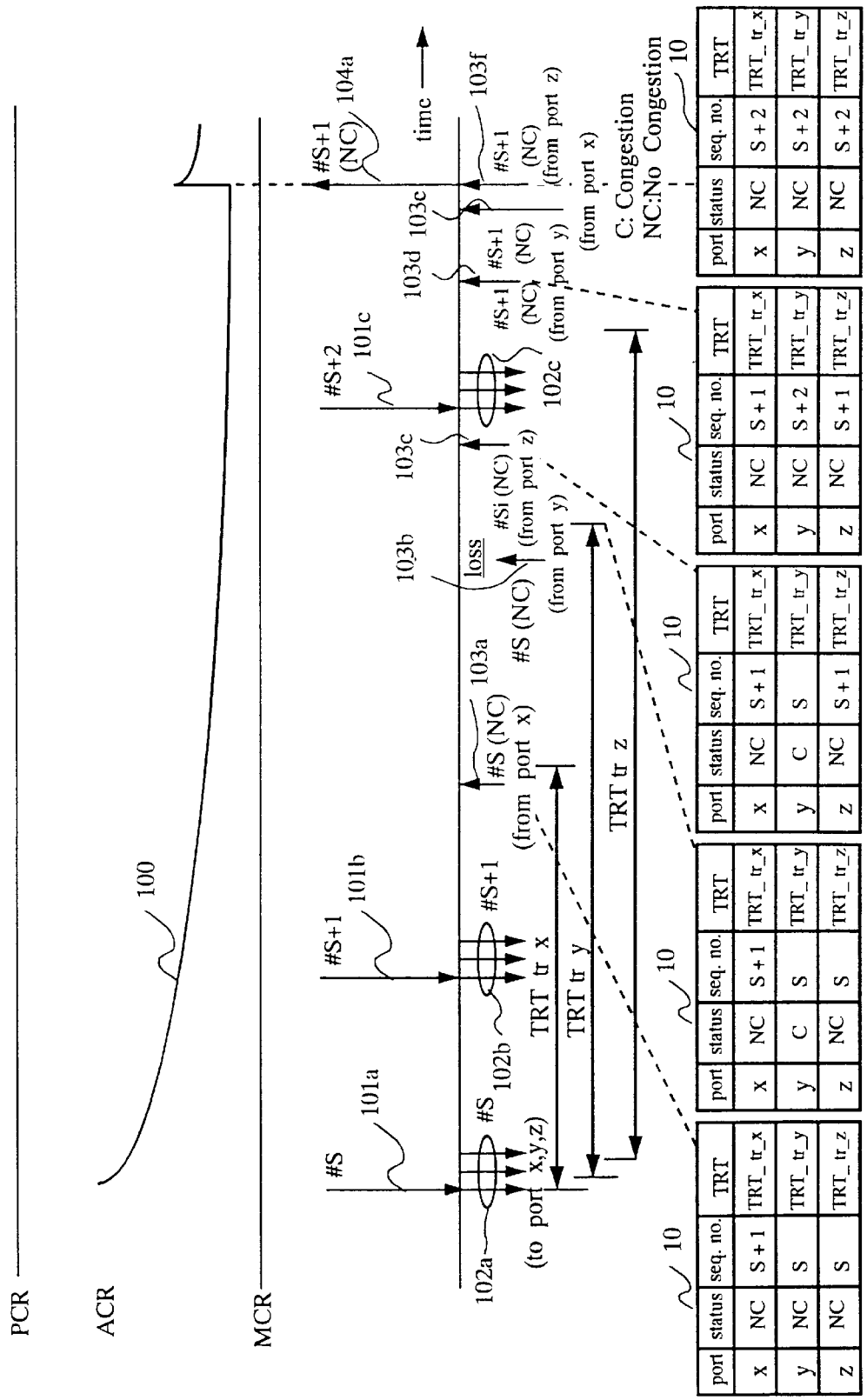
FIG. 10 is a combination drawing showing a graph, a diagram, and congested status management tables that describe an operation of the branching-and-consolidating node when a transmission loss of an RM cell over the backward connection has occurred on the network, according to the first embodiment of the present invention.

FIG. 7 shows a case (1) where no congestion has occurred on the network. FIG. 8 shows a case (2) where congestion has occurred on the network. FIG. 9 shows a case (3) where an RM cell over the backward connection has not been returned to the branching-and-consolidating node within the TRT. FIG. 10 shows a case (4) where a transmission loss of an RM cell over the backward connection has occurred on the network.

For simplifying the description, it is assumed in all of the cases that the branching-and-consolidating node has no FIFO buffers. Consequently, SN_NT_i and SN_tr_i are always the same, and FIGS. 7 through 10 include congested status management tables as illustrated in FIG. 2 having RM cell data entered as data transmission time elapses.

(1) When no congestion has occurred on the network.

Referring to FIG. 7, when the RM cell 103a has been returned to the branching-and-consolidating node, the values of SN_tr_x and TRT_tr_x for the port x in the congested status management table 10 are updated. Likewise, when the RM cell 103b has been returned to the branching-and consolidating node, the values of SN_tr_y and TRT_tr_y for the port y are updated. Furthermore, when the RM cell 103c has been returned to the branching-and-consolidating node, the values of SN_tr_z and TRT_tr_z for the port z are updated. Then, referring to FIG. 7, the sequence numbers of the RM cells returned to the branching-and-consolidating node are changed to #S+1. Consequently, when the RM cell 103c has been returned to the branching-and-consolidating node, the sequence number #S+1 represents the minimum sequence number. Then, this last received RM cell 103c is transmitted onto the subsequent physical transmission line as the RM cell 104a.

(2) When congestion has occurred on the network.

Referring to FIG. 8, since the RM cell 103a is a congested status cell, this RM cell is transferred onto the subsequent physical transmission line as the RM cell 104a. Then, the RM cell 103c is returned to the branching-and-consolidating node through the port z as the congested status RM cell. Once the RM cell 103c has been returned, the sequence numbers of the congested status RM cells returned to the branching-and-consolidating node are compared. Since SN_tr_z is found not to be the maximum, the RM cell 103c will not be transferred onto the subsequent physical line.

(3) When an RM cell over the backward connection has not been returned to the branching-and-consolidating node within the TRT.

Referring to FIG. 9, an RM cell has not been returned to the branching-and-consolidating node through the port y even if TRT_tr_y has passed. Consequently, Status_y in the congested status management table is changed to C or the congested state. Then, after the RM cell 103c has been returned to the branching-and-consolidation consolidating node through the port y, the contents of the congested status management table are changed back to the original state.

(4) When a transmission loss of an RM cell over the backward connection has occurred on the network.

Referring to FIG. 10, when a transmission loss of an RM cell through the port y has occurred because of a network condition, an RM cell having the sequence number i+1 will not be transmitted onto the subsequent physical transmission line. however, when an RM cell having the sequence number i+2 has been returned to the branching-and-consolidating node, data transmission is returned to the normal state.

By executing the above-mentioned operations, the processing on RM cells returned to the branching-and-consolidating node over the backward connection can be defined. Consequently, stable congestion control in the multicast connection network, which is the primary object of the present invention, can be obtained.

Second Embodiment

As another method of calculating TRT_tr_i in place of the moving-average method used in the first embodiment, the exponential smoothing method may be used alternatively. It is the method in which a weighted average of the time is taken exponentially by successively adding the time required for all ports to transmit an RM cell over the forward connection and receive the same over the backward connection exponentially.

Alternatively, the averaging method may be used instead of the moving-average method. It is simple, and produces a result substantially similar to that obtained by the moving-average method.

Alternatively, the value of TRT_tr_i extrapolated by means of regression analysis may be used instead of the moving-average. On the other hand, other statistical methods may also be used to produce similar effects.

Furthermore, the value of TRT_tr_i may also be determined by calculating a transmission distance from the branching-and-consolidating node to the destination terminal and the number of nodes interposed therebetween, instead of monitoring the time for all ports to transmit an RM cell over the forward connection and receive the same over the backward connection. It means that, in a wide area network, more attention should be given to the fixed delay in a long-distance data transmission or in the processing on RM cells in the branching-and-consolidating node rather than the delay in the transmission of RM cells over short distances.

In the first embodiment, when one of the connections is found to be in the congested state, only a congested status RM cell returned to the branching-and-consolidating node first is returned to the source terminal over the backward connection. On the other hand, when all of the connections are found to be in the uncongested state, only an uncongested status RM cell returned to the branching-and-consolidating node last is returned to the source terminal over the backward connection. Both of these operations are implemented in synchronism with the RM cell transmission to the branching-and-consolidating node over the backward connection. In this embodiment, RM cells returned to the branching-and-consolidating node over the backward connection are stored therein without being returned to the source terminal. Then, after a predetermined period of time, the stored RM cells may be transformed to the RM cells indicative of the congested state or the uncongested state of the network, and may be transferred onto the subsequent physical transmission line.

Third Embodiment

In this embodiment, the processing on RM cells as described in the first embodiment is not implemented in all of the branching-and-consolidating nodes. It is implemented in a specific branching-and-consolidating node according to the rule which will be defined hereinafter. Now, an example of this operation will be described.

In this embodiment, the branching-and-consolidating node which will not branch nor consolidate RM cells as described in the first embodiment will perform operations in accordance with the EPRCA as in the conventional unicast connection network.

As the branching-and-consolidating node for branching and consolidating RM cells, the branching-and-consolidating node nearest to the source terminal is selected. In the network configuration shown in FIG. 25, the branched connections from the destination terminal T7 and the destination terminal T8 are consolidated in the node N5. However, this node will not branch nor consolidate RM cells, and the node N4, nearest to the source terminal T5 will branch and consolidate RM cells. In this case, the node N4 consolidates RM cells returned from the destination terminals T6, T7, and T8 over the backward connection. With regard to the RM cells from the destination terminals T7 and T8, they are returned to the node N4 through the same physical transmission line L8. Consequently, the port name to be entered in the congested status management table illustrated in FIG. 2 must be the connection as a lower layer of the port. Hence, congestion status management for the destination terminals T7 and T8 is implemented for the connections instead of the ports.

The above-mentioned operation may be implemented in the node N3 which is not the branching-and-consolidating node and nearest to the source terminal. In this case, a similar result can also be obtained.

As described above, selection of the branching-and-consolidating node nearest to the source terminal for implementing the processing on RM cells over the backward connection can lead to the reduction of the processing load on the branching-and-consolidating node, which is another object of the present invention.

Fourth Embodiment

In this embodiment, an operation for starting the consolidation of RM cells and an operation for canceling the consolidation of RM cells due to the addition to or reduction of multicast connections will be described.

Consolidation of RM cells is implemented, depending on whether the number of the branched connections in a specific branching-and-consolidating node is equal to or more than a predetermined number.

Figure 11A:
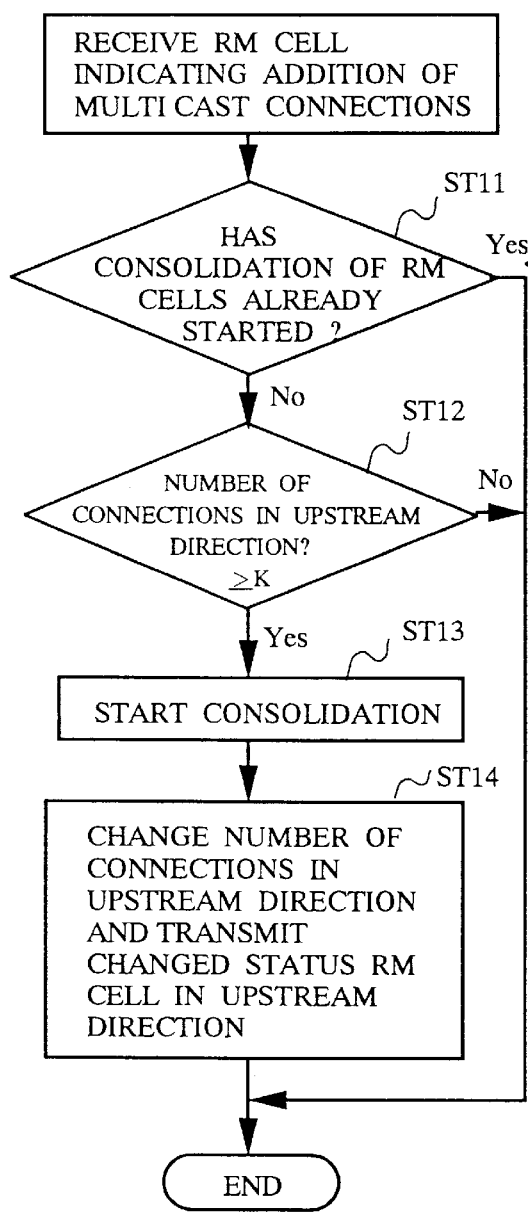
FIG. 11A and FIG. 11B are flowcharts showing an algorithm used when consolidation of RM cells over the backward connection is implemented in a specific branching-and-consolidating node based on the number of the branched connections.
Figure 11B:
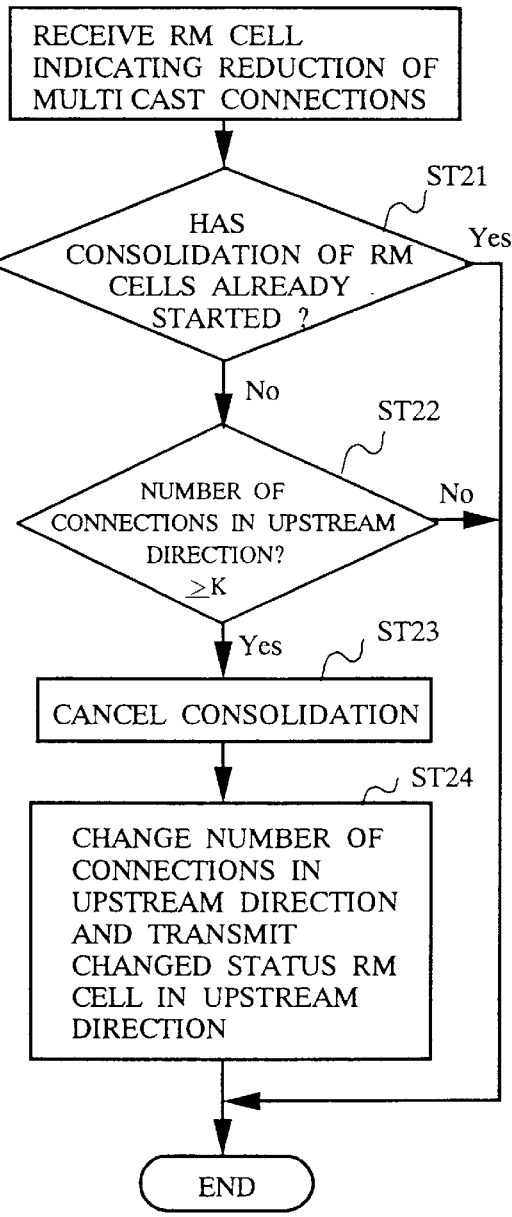

FIG. 11A and FIG. 11B are flow charts showing this procedure. FIG. 11A shows the operations to be executed when the number of multicast connections has increased. On the other hand, FIG. 11B shows the operations to be executed when the number of multicast connections has decreased.

Referring to FIG. 11A and FIG. 11B, an operation of this embodiment will be described.

When the number of multicast connections has been increased, it is checked at ST11 whether the branching-and-consolidating node has already started consolidating RM cells returned thereto over the backward connection. When the branching-and-consolidating node has already started consolidating RM cells, the number of RM cells to be consolidated therein should only be increased. When the branching-and-consolidating node has not started consolidating RM cells yet, it is determined at ST12 whether the number of multicast connections in the upstream of the source terminal is equal to or more than a predetermined number k. When the number of the multicast connections is determined to be equal to or more than k, consolidation of RM cells is determined to be executed. Then, at ST14, the number of the multicast connections in the upstream of the source terminal controlled by the multicast connection control apparatus inside the branching-and-consolidating node is changed. At the same time, an RM cell indicative of the change which will be hereinafter referred to as the changed status RM cell is transmitted to the branching-and-consolidating nodes in the upstream direction so as to notify the change. This operation is also executed when the branching-and-consolidating node has received the changed status RM cell from the branching-and-consolidating node provided in the downstream direction.

When the number of multicast connections has been reduced, it is also checked at ST21 as shown in FIG. 11B whether the branching-and-consolidating node has already started consolidating RM cells returned thereto over the backward connection. When the branching-and-consolidating node has already started consolidating RM cells, it is determined at ST22 whether the number of the multicast connections is below k. When the number of the multicast connections is below k, consolidation of RM cells is canceled at ST23. Then, the changed status RM cell is transmitted to the branching-and-consolidating node in the upstream direction at ST24. This operation is also executed when the branching-and-consolidating node has received the changed status RM cell from the branching-and-consolidating node provided in the downstream direction.

For executing the above-mentioned operations, the threshold value k for determining the number of multicast connections may exhibit a hysteresis at the time when consolidation of RM cells has been started or canceled. The changed status RM cell is transferred over the management and communication connection provided between the branching-and-consolidating nodes.

By implementing the above-mentioned operation, the branching-and-consolidating node for consolidating RM cells over the backward connection may be actively selected. The reduction of the processing load on the branching-and-consolidating node, which is another object of the present invention, thus can be achieved.

Consolidation of RM cells may be implemented based on the sum of the PCR for the branched connections rather than the number thereof. When the sum of the PCR for the branched connections has become equal to or more than a predetermined value, consolidation of RM cells is implemented.

As described above, the selection of the branching-and-consolidating node for implementing the processing on RM cells over the backward connection can result in the reduction of the processing load on the branching-and-consolidating node, which is another object of the present invention.

Fifth Embodiment

In this embodiment, an example of specifying a consolidating operation for RM cells by a specific one or all of the branching-and-consolidating nodes at a setting phase of "call" will be described.

Figure 12A:
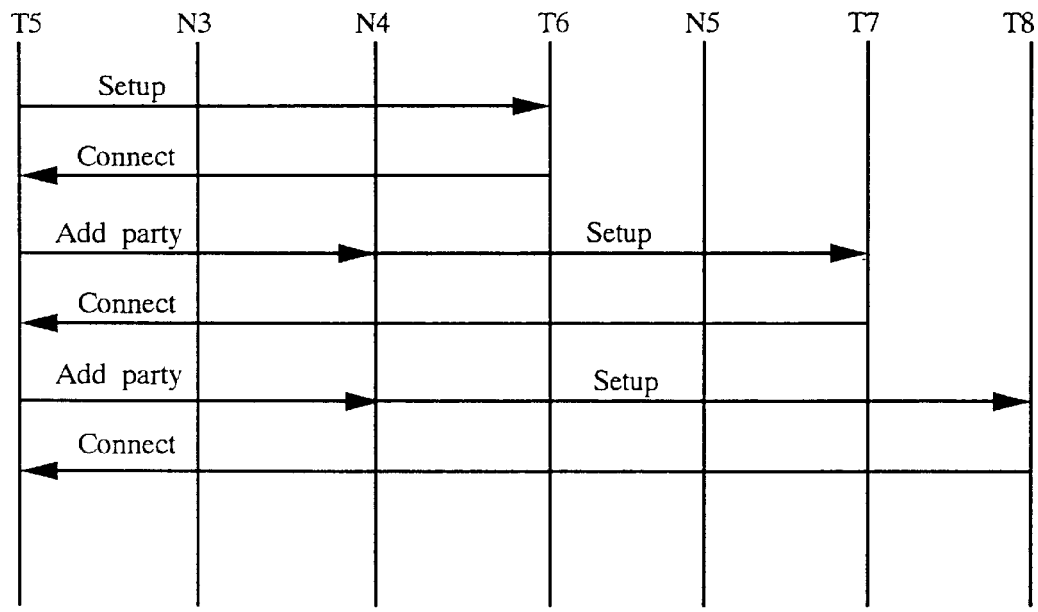
FIG. 12A and FIG. 12B are diagrams showing an operation sequence for directing a specific branching-and-consolidating node to consolidate RM cells over the backward connection at a connection setting phase.
Figure 12B:
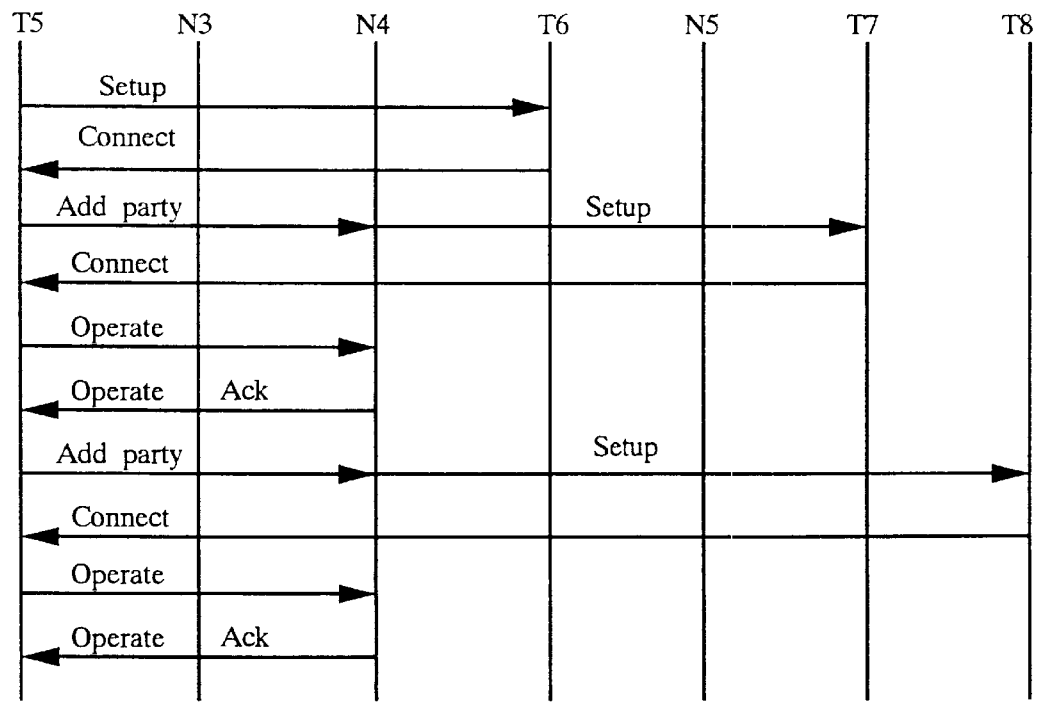

FIG. 12A and FIG. 12B are diagrams showing an operation sequence for directing the specific branching-and-consolidating node to consolidate RM cells in the multicast connection network illustrated in FIG. 25. As shown in the upper half of FIG. 12A, consolidation of RM cells is requested for the branching-and-consolidating node in a normal multicast connection setting sequence. More specifically, the following two systems are applied for the consolidation of RM cells: one is the system in which a consolidation request command is included in a Setup or Add party message, and the other is the system in which a sequence for executing an operation request such as Operate and Operate Ack is provided in addition to the normal multicast connection setting sequence.

By executing the above-mentioned operation, the branching-and-consolidating node for implementing the processing on RM cells returned thereto over the backward connection can be determined in the signaling procedure at the time of setting the multicast connections. The processing load on the branching-and-consolidating node thus can be reduced.

When consolidating RM cells returned to the branching-and-consolidating node over the backward connection, RM cells transmitted from the destination terminal with no flow control function are not to be consolidated. Data transmission to that destination terminal is implemented at the transmitting rate determined between the destination terminals with a flow control function. In the multicast connection network shown in FIG. 25, for example, when the destination terminal T7 has no flow control function, data transmission from the source terminal T5 to the destination terminal T7 is implemented at the transmitting rate determined for the connection to the destination terminal T8 or the connection to the destination terminal T6. Thus, even if a terminal with no flow control function is provided on the multicast connection network, the above-mentioned system configuration can be implemented so as to achieve congestion control.

Sixth Embodiment

In this embodiment, a destination terminal provided on the branched connection in which a failure has occurred will not be subject to data flow control. In the multicast connection network illustrated in FIG. 25, for example, when a failure has occurred in the physical transmission line L8, the destination terminals T7 and T8 for the physical transmission line L8 will not be subject to the flow control. The failure in this case may be detected as a physical link failure, a connection failure, or a protocol failure between the terminals.

Figure 13:
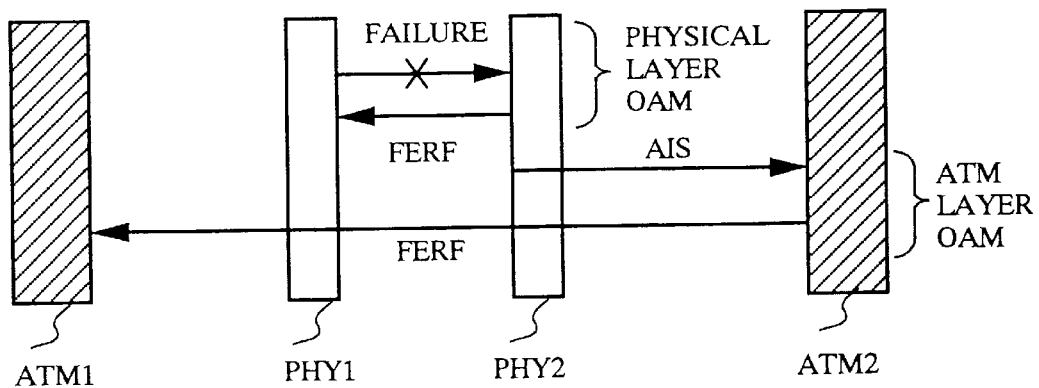
FIG. 13 is a block diagram showing an OAM sequence for sending a warning in terms of the physical layer and the ATM layer of a data transmission system according to the sixth embodiment of the present invention.

The physical link failure and the connection failure can be detected by an OAM (Operation and Maintenance) signal. In order to detect the physical link failure or the connection failure, the procedures of the ATM standard defined in the UNI specification 3.1 version established by the ATM forum, for example, can be extended. Specifically, according to the rule related to the OAM, the OAM for sending a warning to the data transmission system includes the step of sending a physical layer OAM signal and the step of transmitting an ATM layer OAM cell as shown in FIG. 13. In FIG. 13, when a physical layer failure has been detected in a physical layer terminal PHY2 such as, for example, a node, a physical layer OAM signal FERF is transmitted from the physical layer terminal PHY2 to a physical layer terminal PHY1 through the transmission line provided opposite to the transmission line in which the failure has occurred.

At the same time, an ATM layer AIS cell is transmitted to a destination terminal such as, for example, an ATM layer terminal ATM2. Then, the destination terminal ATM2 transmits an ATM layer FERF cell to an ATM layer terminal ATM1 such as, for example, the source terminal. Consequently, a failure can be recognized at both ends of the ATM connection such as, for example, between the source terminal and a destination terminal. The transfer of the OAM information in the multicast connection network over the backward connection has not been defined in the ATM standard. Consequently, the extension to the above-mentioned procedures is implemented.

The extension to the procedures in the ATM standard will be described, by referring to FIG. 14A and FIG. 14B.

Figure 14A:
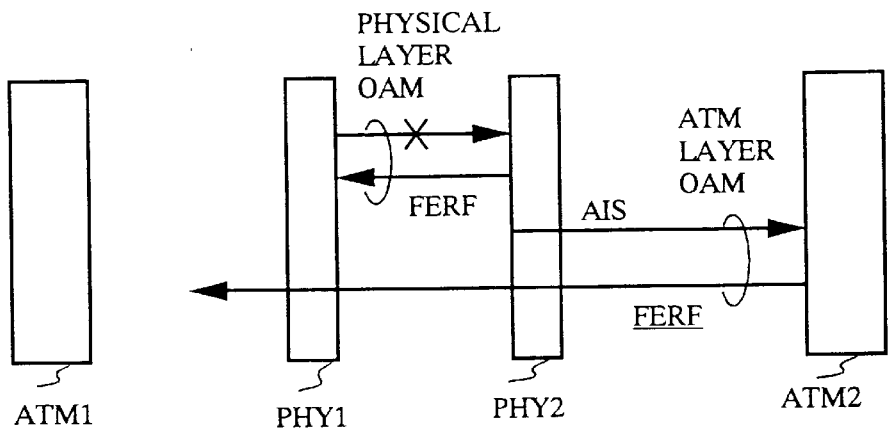
FIG. 14A and FIG. 14B are block diagrams showing an extended OAM sequence for sending a warning in terms of the ATM layer over the backward connection in the multicast connection network.
Figure 14B:
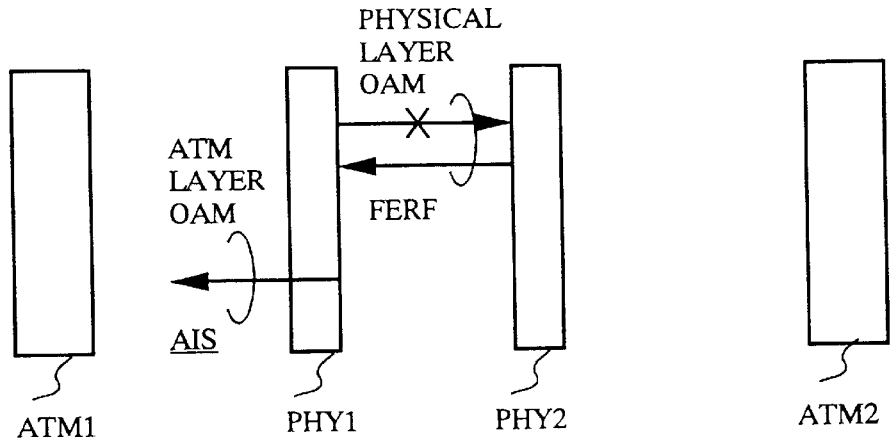

In FIG. 14A and FIG. 14B, the ATM1 is assumed to be the source terminal. When one of the destination terminals ATM2 receives an AIS cell which is an ATM layer OAM cell, the procedure is extended such that the destination terminal ATM2 transmits a FERF cell to the source terminal ATM1 over the backward connection as shown in FIG. 14A. When the physical terminal PHY 2 detects a failure as shown in FIG. 14B, the procedure is extended such that the physical layer terminal PHY1 transmits an AIS cell to the source terminal ATM1 over the backward connection. Consequently, the above-mentioned system configuration allows the devices provided in the upstream direction of the multicast connection network such as the source terminal ATM1, for example, to detect a failure in the multicast connection.

The above-mentioned extension allows the branching-and-consolidating node for consolidating RM cells over the backward connection to detect a failure in the branched connections thereof and exclude that connection from data flow control. Consequently, even if a failure has occurred in one of the terminals, normal data flow control is possible between other terminals.

When the above extensions to the procedures in the ATM standard are implemented, the ATM layer OAM signal should be cutout in a node between the branching-and-consolidating node for consolidating RM cells and the node nearest to the source terminal so as to conform to the UNI specification. Consequently, even if a failure has occurred in the data transmission system, the current standardized OAM data flow control is possible between the devices free from the failure.

Seventh Embodiment

In the first embodiment, when uncongestion of the network is detected in all of the branched connections in returning RM cells to the source terminal over the backward connection, only the uncongested status RM cell that has been detected last in the branching-and-consolidating node will be transferred onto the subsequent physical transmission line. In this embodiment, the uncongested status RM cell is transmitted to the source terminal when it is recognized that the predetermined number of branched connections are in the uncongested state. By implementing this operation, transmission of insignificant data is possible between the terminals having different bandwidths. In this embodiment, the predetermined number of branched connections means the significant connections for data transmission. Hence, when all of the significant connections are in the uncongested state, all the other connections are also regarded to be in the uncongested state.

Furthermore, in the ER mode, a predetermined bandwidth of a terminal is notified to the source terminal rather than the narrowest bandwidth of the terminal. Thus, transmission of insignificant data is possible between the terminals having different bandwidths.

Eighth Embodiment

In the embodiments described hereinbefore, the data transmission system is closed between the source terminal and the destination terminals. Consequently, congested status management is implemented by the system called an independent control segment. Within this independent control segment, congested status management is implemented so as to obtain the optimum ACR. By the way, when a destination terminal is more distant to the source terminal than any other destination terminal, it takes more time to obtain a response regarding the congested state of the port therefor. Consequently, as will be described hereinafter, transmission efficiency of the corresponding physical transmission lines will be reduced.

Now, a description will be directed to a case where the transmission efficiency of the physical transmission lines is improved according to this embodiment of the present invention.

FIG. 15 is a block diagram showing a multicast tree network which is also referred to as control segments.

In FIG. 15, reference numerals T31, T32, and T33 denote terminals. The terminal T31 is the source terminal, and the T32 and the T33 are destination terminals. Reference numerals N31, N32, and N33 denote nodes. The N32 denotes a branching-and-consolidating node. Reference numerals L31, L32, L33, L34 denote physical transmission lines. Reference numeral 200 represents a transmission direction of RM cells over the forward connection, and reference numeral 201 represents a transmission direction of RM cells over the backward connection.

Figure 16A:
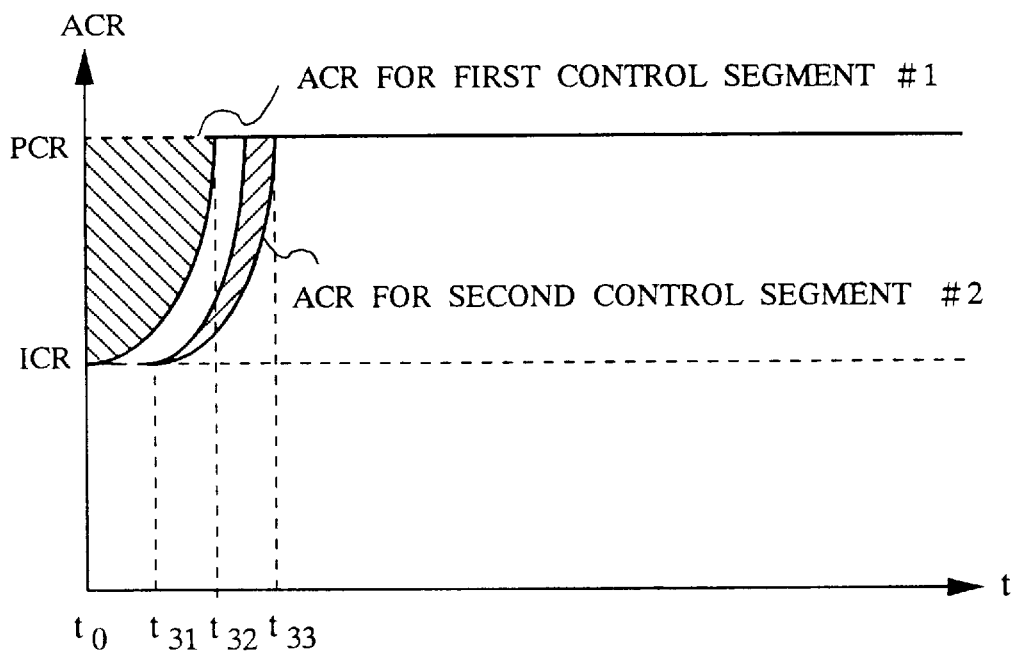
FIG. 16A and FIG. 16B are graphs showing a change of the ACR with the elapse of time in the data transmission system illustrated in FIG. 15.
Figure 16B:
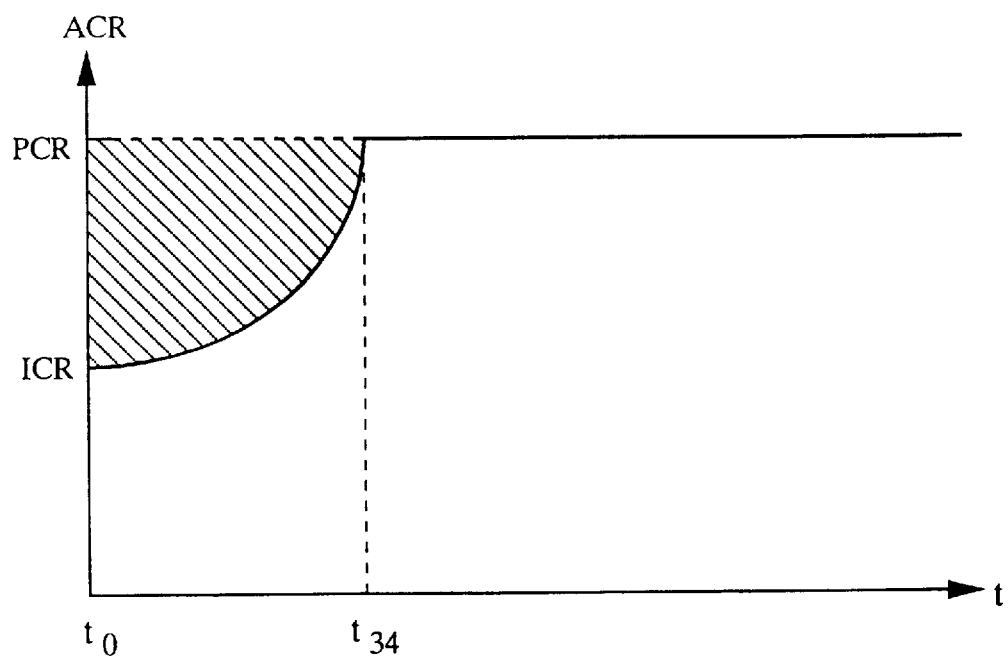

FIG. 16A and FIG. 16B are graphs showing a change of the ACR with the elapse of time in the multicast tree structure illustrated in FIG. 15. FIG. 16A shows a change of the ACR with the elapse of time for the control segments provided by dividing the data transmission system according to this embodiment of the present invention, and FIG. 16B shows a change of the ACR with the elapse of time for a single control segment as a comparison.

An operation of the multicast tree structure according to this embodiment of the present invention will be described.

It is assumed in FIG. 15 that the physical transmission line Lx is sufficiently long, compared with other physical transmission lines. In this system configuration, the node N32 is divided into the first and second control segments. The first control segment #1 includes the source terminal T31, the node N31, the node N32, and the destination terminal T32. On the other hand, the second control segment #2 includes the node N32, the node N33, and the destination terminal T33. Data flow control is individually implemented in the first control segment #1 and the second control segment #2. In this case, the conventional flow control system in the multicast connection network or the unicast connection network can be applied.

Selection of the node bordering the control segments may be implemented such that a response regarding an RM cell can be transmitted both to a destination terminal and to the selected node from the source terminal concurrently. It means that, in FIG. 15, for example, the node for dividing the control segment is selected such that a response regarding an RM cell can be concurrently transmitted both to the terminal T32 and to the node N32 through the L32 and the L33, respectively.

The node N32 in FIG. 15 serves as a destination terminal in the first control segment #1. On the other hand, in the second control segment #2, the node N32 serves as the source terminal. Consequently, it is referred to as a VS/VD (Virtual Source/Virtual Destination). Then the VD facility is installed in the first control segment #1, and the VS facility is installed in the second control segment #2. In the system configuration illustrated in FIG. 15, congested status management is individually implemented in the first control segment and the second control segment. In the first control segment, for example, the branching-and-consolidating node other than the node N32 implements congested status management. However, data transmission between the two control segments is implemented via the node N32.

In this data transmission between the two control segments, the ACR behaviors are as shown in FIG. 16A. Data transmission is initiated at the ICR, and the transmitting rate will increase as the frequency of the return of the RM cells to the source terminal increases. In accordance with the EPRCA, the overall ACR will change in proportion to the ACR at that point. Consequently, as shown in FIG. 16A, the curve showing the ACR increase becomes a parabola moving up to the right. After the time $t_{31}$, the node N32 within the second control segment #2 initiates data transmission at the ICR in the same manner as the first control segment #1. Then, at the time $t_{33}$, the ACR reaches the PCR. In FIG. 16A, the areas indicated by oblique lines are the free bandwidth areas which cannot be actually used for data transmission due to a restriction placed on the data flow control. They include the area on the left of the curve showing the ACR increase to the PCR in the first control segment #1, and the area between the curve showing the ACR increase to the PCR in the first control segment #1 and the curve showing the ACR increase to the PCR in the second control segment #2.

FIG. 16B shows the relationship between the behaviors of the ACR and the bandwidth to be wasted when the node N33 and the destination terminal T33 are included in the first control segment #1 as in the conventional multicast connection network. In this case, it takes more time for the source terminal T31 to transmit an RM cell to the remote destination terminal T33 over the forward connection and receive the same over the backward connection. Consequently, the time required for the ACR to reach the PCR in this case, indicated by the time t34 becomes longer than the time required for the ACR to reach the PCR in the first control segment #1 or the second control segment #2. Generally, it takes less time for the ACR to reach the PCR in this embodiment and a smaller amount of bandwidth will be wasted.

By implementing the above-mentioned operation, the data flow control system makes the efficient use of available bandwidth in the multicast connection network.

Ninth Embodiment

In the eighth embodiment, a plurality of control segments in a multicast tree structure initiate data transmission individually at the same ICR. This embodiment aims to enhance efficiency in the use of available bandwidth area by individually setting the ICRs for the control segments.

Figure 17:
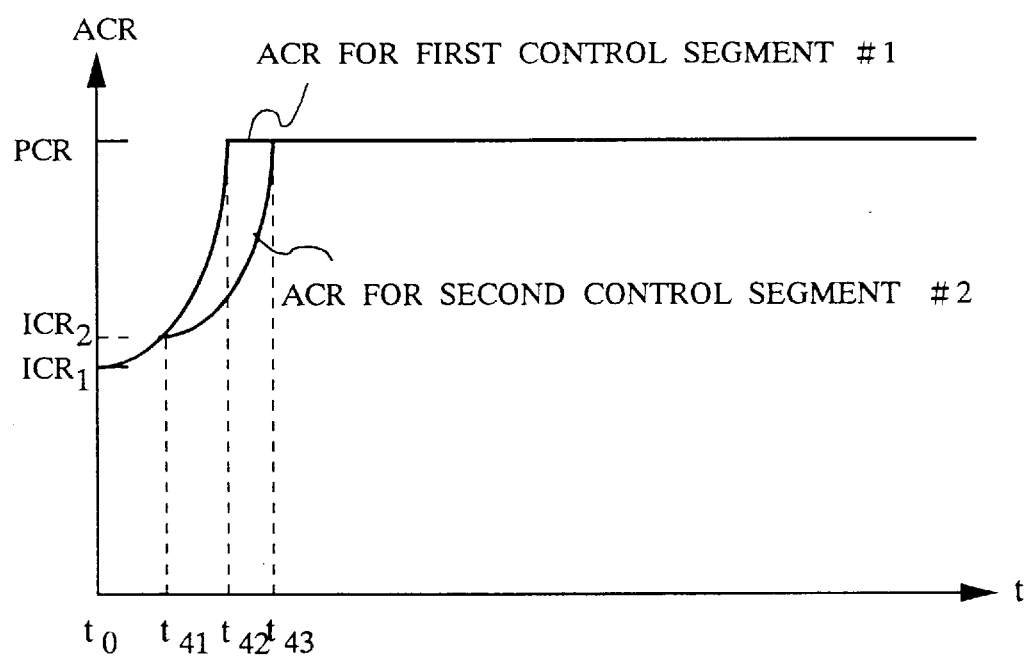
FIG. 17 is a graph showing a change of the ACR with the elapse of time in a data transmission system according to the ninth embodiment of the present invention.

In this embodiment, different ICRs are set for the first control segment #1 and the second control segment #2. FIG. 17 shows a change of the ACR with the elapse of time on this condition. Normally, the ICR is set in the signaling procedure at the time of setting the connections. However, when the data transmission system has the VS function, the ICR is set independently of the signaling procedure. In the ER mode, for example, the transmitting rate set on the RM cell to be transmitted first to the node N32 with the VD facility over the forward connection is set to be the ICR for the VS facility in the second control segment #2. By implementing the above-mentioned operation, the ACR in the second control segment #2 can reach the PCR in much less time.

The ICR for the VS facility in the second control segment #2 may be set by using other methods. By implementing the above-mentioned operation based on the system configuration described above, a stable data flow control system making the efficient use of the available bandwidth area can be obtained.

Tenth Embodiment

In this embodiment, a description is directed to a data transmission system in which switching of the branching-and-consolidating node is actively performed as an independent control segment with a change of a terminal to be controlled.

By implementing the above-mentioned operation, an optimum branching-and-consolidating node for congested status management can always be selected.

A data transmission system according to this embodiment is described. The data transmission system to be described hereafter is the system in which consolidation of RM cells over the backward connection is implemented in a single branching-and-consolidating node nearest to the source terminal.

Figure 18A:
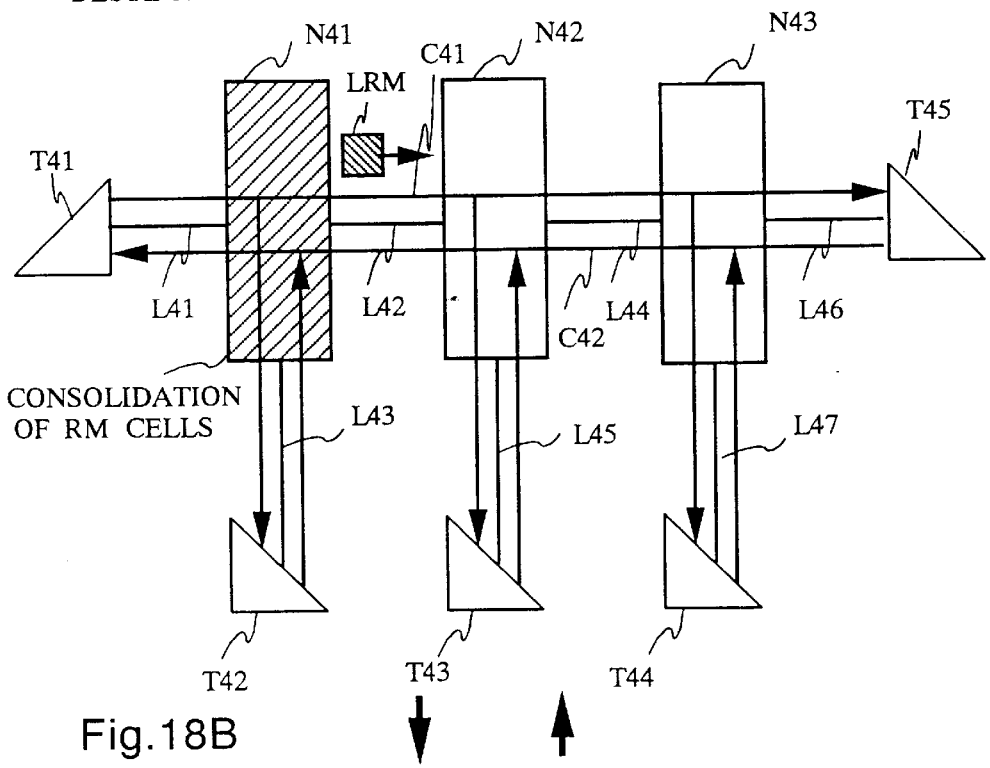
FIG. 18A and FIG. 18B are block diagrams showing that the branching-and-consolidating node for consolidating RM cells over the backward connection is switched due to a change of a multicast tree structure according to the tenth embodiment of the present invention.
Figure 18B:
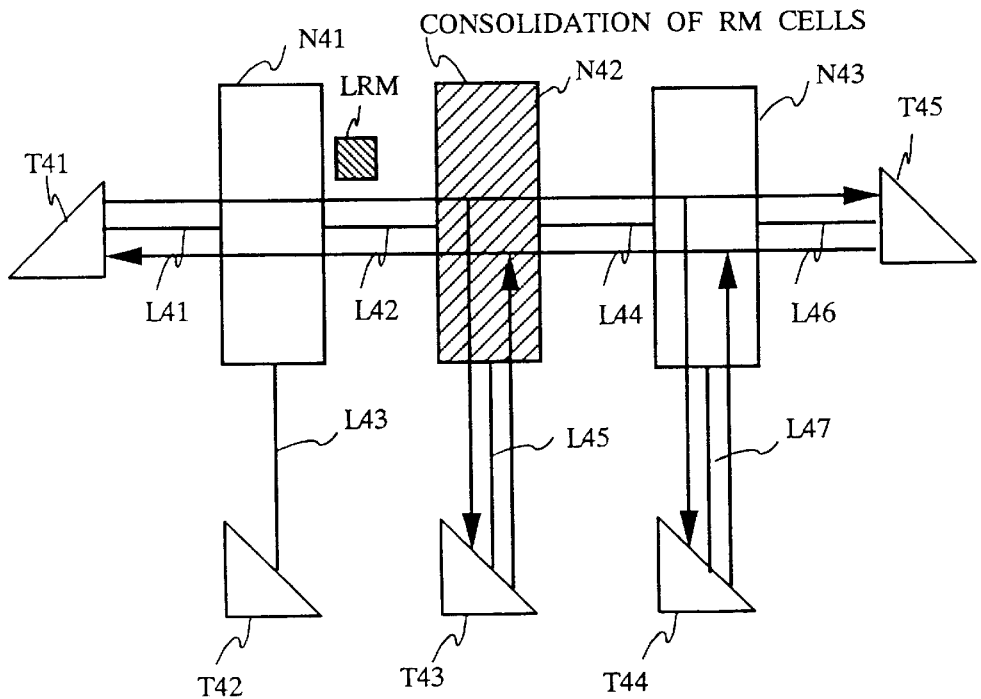

FIG. 18A and FIG. 18B show an active change of a multicast tree structure in accordance with, for example, the signaling procedure, and switching of the branching-and-consolidating node for consolidating RM cells. FIG. 18A shows a case where a destination terminal has been added. On the other hand, FIG. 18B shows a case where a number of destination terminals have been reduced for data transmission.

In FIG. 18A and FIG. 18B, reference numerals T41, T42, T43, T44, and T45 denote terminals. Among them, the T41 denotes the source terminal, and the T42, T43, T44, and T45 denote destination terminals. Reference numerals N41, N42, and N43 denote nodes. Reference numerals L41 through L47 denote physical transmission lines. Reference numerals C41 and C42 denote multicast connections. The C41 denotes a forward connection. On the other hand, the C42 denotes a backward connection. A local RM cell indicated by LRM is used for implementing switching of the branching-and-consolidating node for consolidating RM cells. It is referred to as a local RM cell, because it is not an RM cell defined in the ATM standard. Big arrows connecting FIG. 18A and FIG. 18B show the transition directions when the multicast tree structures illustrated in FIG. 18A and FIG. 18B have been changed. The downward big arrow connecting FIG. 18A and FIG. 18B shows the transition direction when a destination terminal is removed from the multicast tree structure due to the reduction of the connections, or when the destination terminal T42 has been removed from the multicast tree structure as shown in FIG. 18B. The upward big arrow shows the transition direction when a destination terminal has been added due to the increase of the connections, or when the destination terminal T42 has been added to the multicast tree structure, as shown in FIG. 18A.

Figure 19:
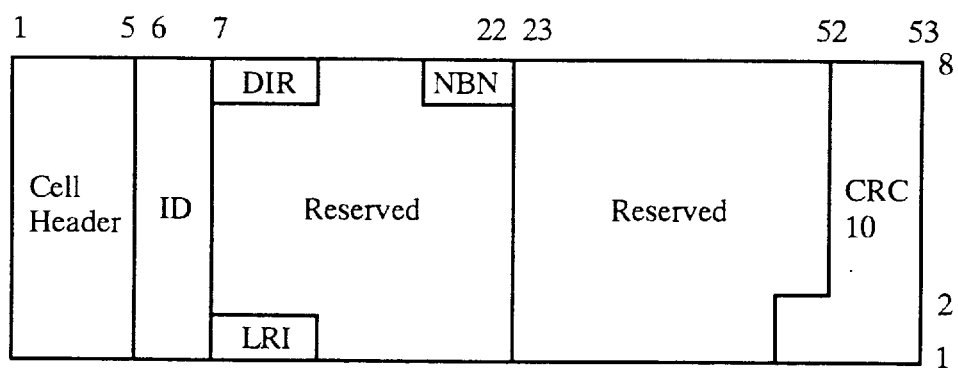
FIG. 19 is a block diagram showing a format of a local RM cell.

FIG. 19 shows a format of the local RM cell indicated by LRM which is transmitted by the branching-and-consolidating node in the downstream direction when a destination terminal to be controlled has been changed.

Referring to FIG. 19, reference sign ID denotes a specific pattern used to identify the local RM cell and the standardized RM cell. Reference sign DIR denotes a transmission direction of RM cells. DIR=0 indicates the forward connection, and DIR=1 indicates the backward connection. Reference sign LRI denotes a bit for identification of a local RM cell. The RM cell indicating the LRI is "1" shows that the RM cell is a local RM cell. The LRI supplies information as to the declaration or request of the branching-and-consolidating node. Reference sign NBN denotes a bit for notifying the node for consolidating RM cells over the backward connection.

FIG. 20A, FIG. 20B, FIG. 20C, and FIG. 20D are flow charts showing the generation of the local RM cell and switching control operations of the nodes in the downstream when the local RM cell has been transmitted thereto.

Referring to FIG. 20A through FIG. 20D, the operations of the nodes will be described.

Each node has the following flags:

NBN_flag which indicates that the node having this flag is the branching-and-consolidating node for consolidating RM cells over the backward connection.

DN_flag which indicates that the node having this flag is downstream of the branching-and-consolidating node for consolidating RM cells.

Herein, in the initial state, these flags are put into the reset state.

After the setting of the connections has been finished, the control operations as shown in FIG. 20A, FIG. 20B, FIG. 20C, and FIG. 20D are executed as follows:

(A) After a connection has been added at ST101, or after a transition shown by the upward big arrow has taken place as shown in FIG. 18B to FIG. 18A, it is checked at ST102 whether NBN_flag is in the reset state and DN_flag is also in the reset state. Referring to FIG. 18A, the node N41 implements this operation. If it has been found that both NBN_flag and DN_flag are in the reset state, a local RM cell indicating that the DIR is "0" and the NBN is "1" is transmitted in the downstream direction at ST103. Referring to FIG. 18A, a local RM cell is transmitted from the node N41 to the node N42.

Then, NBN_flag is set. Referring again to FIG. 18A, the node N41 implements this operation. The node N41 thereby declares to be the branching-and-consolidating node for consolidating RM cells.

Figure 20A:
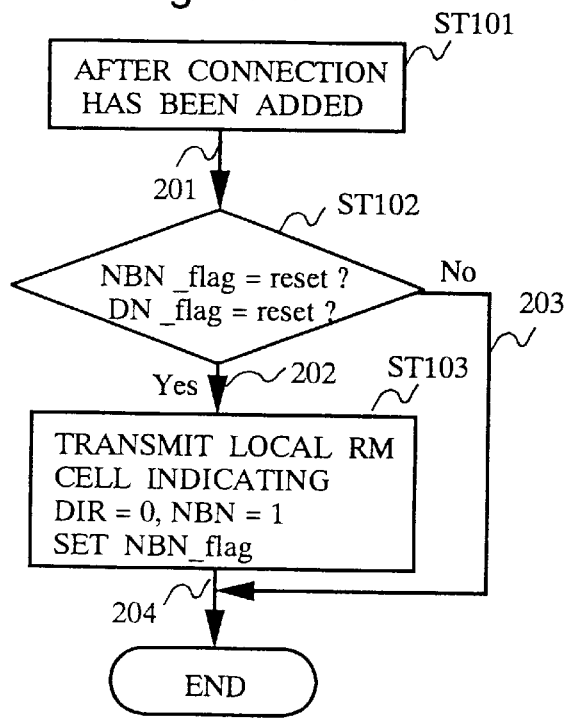

(B) After the local RM cell indicating that the DIR is "0" and the NBN is "1" has been transmitted to the node in the downstream direction at ST111, or after a transition shown by the upward big arrow has taken place and then the local RM cell generated and transmitted in accordance with the flow chart illustrated in FIG. 20A has been transmitted from the node N41 to the node N42 and the node N43 in the downward stream direction, as shown in FIG. 18A, DN_flag is set at ST112. Then, NBN_flag is reset, and the local RM cell is transferred to the subsequent node.

Figure 20C:
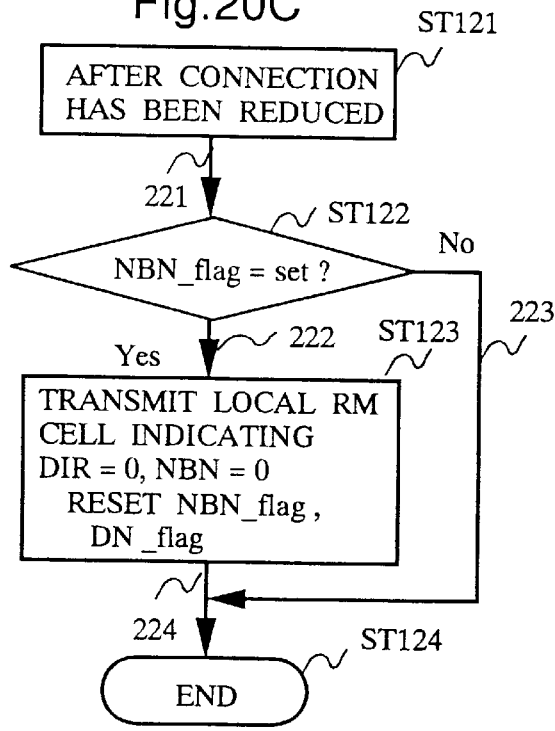
Figure 20B:
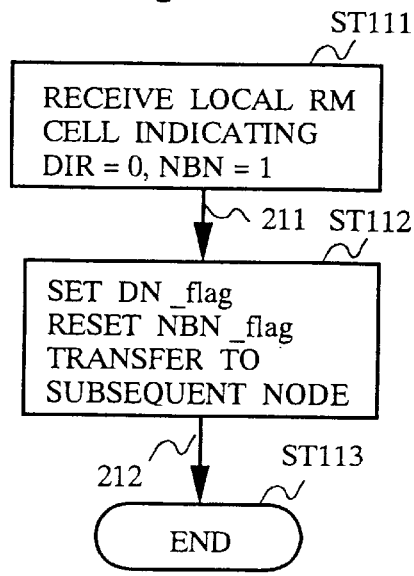

(C) After a connection has been reduced at ST121 in FIG. 20C, or after a transition shown by the downward big arrow has taken place, as shown in FIG. 18B, it is checked at ST122 whether NBN_flag has already been set. Referring to FIG. 18B, the node N41 implements this operation. If it has been found that NBN_flag has already been set, a local RM cell indicating that the DIR is "0" and the NBN is "0" is transmitted from the branching-and-consolidating node at that time at ST123. Referring to FIG. 18B, a local RM cell is transmitted from the node N41 to the node N42. Then, NBN_flag is reset, and DN_flag is reset. Referring again to FIG. 18B, the node N41 implements this operation. It means that the node N41 is no longer the branching-and-consolidating node for consolidating RM cells.

(D) After the local RM cell indicating that the DIR is "0" and the NBN is "0" has been transmitted to the node in the downstream direction at ST131, or after a transition shown by the downward big arrow has taken place and the local RM cell generated and transmitted in accordance with the flow chart illustrated in FIG. 20C has been transmitted from the node N41 to the node N42 as shown in FIG. 18B, it is checked at ST132 whether the node which has received the local RM cell (the node N42 in FIG. 18B) is the branching-and-consolidating node.

If it has been found that the node is the branching-and-consolidating node at ST132, and if it has been found that DN_flag is in the reset state at ST133, NBN_flag is set at ST134. Referring to FIG. 18B, the node N42 performs this operation. Then, the node N42 thereby becomes the branching-and-consolidating node for consolidating RM cells.

Then, a local RM cell indicating the DIR is "0" and NBN is "1" is transmitted from the branching-and-consolidating node in the downstream direction. Referring again to FIG. 18B, the above-mentioned RM cell is transmitted from the node N42 to the node N43.

In some cases, the node N42 illustrated in FIG. 18B may not be able to become the branching-and-consolidating node due to the RM cell traffic entered thereinto or the like.

Figure 20D:
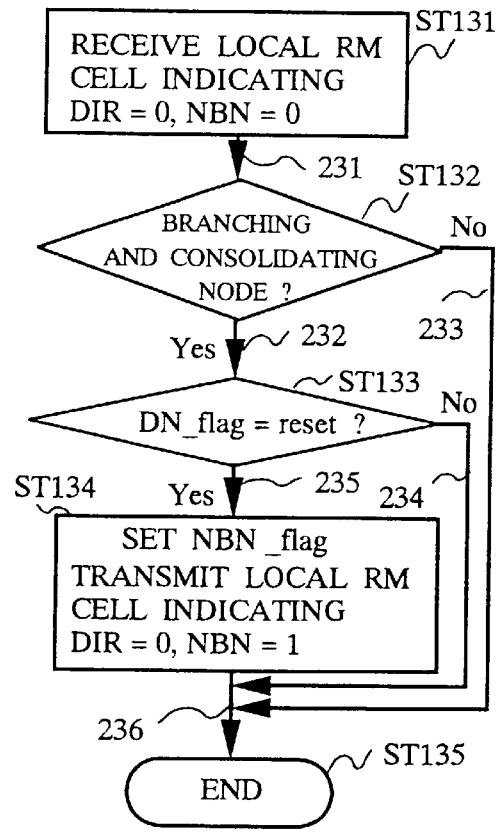

In such cases, the operations illustrated in FIG. 20D will not be executed. The nodes provided in the downstream of the node N41 will not return an acceptance response for the above-mentioned operations. In such cases, the node N41 illustrated in FIG. 18B, for example, transmits a second local RM cell generated in accordance with the flowchart shown in FIG. 20A in the downward direction after a predetermined period of time. Then, the node N41 continues to be the branching-and-consolidating node.

By implementing the above-mentioned operations, when addition or reduction of a destination terminal has been effected in a multicast connection network, switching of the branching-and-consolidating node for consolidating RM cells over the backward connection as required can be implemented.

Eleventh Embodiment

This embodiment relates to a data flow control system in a multicast connection network configured to be a unidirectional ring.

FIG. 21 shows RM cell transmission under the data flow control applied to a unidirectional ring network.

Referring to FIG. 21, reference numerals T51 through T54 denote terminals. Among them, T51 denotes the source terminal, and T52 through the T54 denote destination terminals. Reference numerals N51 through N54 denote nodes. Reference numerals L51 through L58 denote physical transmission lines. Reference numerals RM 51 through RM 56 denote RM cells transmitted along the unidirectional ring. Light-colored RM cells represent RM cells over the forward connection. On the other hand, dark-colored RM cells represent RM cells over the backward connection. Reference numerals #i denote the sequence number assigned to the RM cell transmitted from the source terminal for the ith time.

In this embodiment, it is assumed that the data flow control method described hereinbefore, for example, in the first embodiment is also applied. An RM cell is transmitted from the source terminal T51 and looped on the unidirectional ring. Then, the contents of the RM cell are copied in the branching-and-consolidating nodes N52 and N53, respectively, and then transmitted to the destination terminals T52 and the T53. Then, the RM cell is again looped on the ring and transmitted to the destination terminal T54 through the node N54.

On the other hand, the RM cell over the forward connection is transmitted to the destination terminals T52, T53, and T54, where the attribute DIR of the RM cell is changed from "0" to "1". Then, that RM cell is transmitted over the backward connection to the nodes storing RM cell data for the destination terminals T52, T53, and the T54, respectively. Then, in the node N53, RM cells transmitted over the backward connection from the destination terminal T52 and the destination terminal T53 are consolidated into a single RM cell and transmitted to the node N54. In the node N54, the consolidated RM cell from the node N53 and an RM cell from the destination terminal T54 are consolidated again into a single RM cell and transmitted to the source terminal T51 through the node N51. As described above, in a unidirectional ring, RM cells are looped over the backward connection independently of RM cells over the forward connection.

In order to implement congested status management in a unidirectional ring network, RM cells over the backward connection on the ring should be reduced. Consequently, the contents of the RM cell having the sequence number #i transmitted over the backward connection from a destination terminal to a node such as, for example, the contents of the RM53 transmitted from the destination terminal T52 to the node N52, are copied into the RM cell having the subsequent sequence number #i+1 such as the RM51 transmitted over the forward connection in the N52, and transmitted in the downward direction. Of course, the node N52 copies the contents of the RM cell having the sequence number #i+1 such as the RM51, and transmits them to the destination terminal T52.

As described above, from the RM cell having the sequence number #i+1 transmitted over the forward connection, the node in the downstream direction such as the node N53 can also receive the data on the RM cell having the sequence number #i transmitted over the backward connection.

In this way, each node on the unidirectional ring receives both the data on the RM cell having the sequence number #i transmitted over the forward connection and the data on the RM cell having the sequence number #i−1 transmitted over the backward connection from the RM cell having the sequence number #i transmitted over the forward connection.

Now, the operations of the nodes and the destination terminals on the above-mentioned unidirectional ring is described.

From the source terminal T51, RM cells having the individual sequence numbers are periodically transmitted to the branching-and-consolidating nodes N52, N53, and N54 over the forward connection. Then, the contents of the RM cells are copied in each of the branching-and-consolidating nodes and transmitted to the destination terminals T52, T53, and T54. In the destination terminals T52, T53, and T54, the direction of the RM cell is changed (DIR is changed from "0" to "1"), and the changed RM cell is transmitted over the backward connection to the branching-and-consolidating nodes N52, N53, and N54, respectively as seen from the RM 53 in FIG. 21.

During the above-mentioned operation, the node N52, for example, supplies congestion data on the RM cell having the sequence number #i (the RM53 in this case) over the backward connection to the RM cell having the sequence number #i+1 over the forward connection (the RM51 in this case). The contents of the RM cell having the sequence number #i+1 are to be copied in the node N52 and transmitted over the forward connection on the ring.

Likewise, the node N52 supplies data on the RM cell having the sequence number #i+1 over the backward connection to the RM cell having the sequence number #i+2 to be transmitted over the forward connection.

The node N53 implements the same operation, and the node N54 changes the direction attribute DIR of the RM cell to be transmitted to the node N51 from "0" to "1". Hence, the RM cell is transmitted to the N51 over the backward connection.

In this embodiment, a similar result can be obtained by changing the direction attribute of the RM cell to be returned to the source terminal T51 by the node N51, in place of the node N54.

Selection of the RM cell for receiving data on the RM cell transmitted from the destination terminal to the branching-and-consolidating node over the backward connection does not always have to be based on the sequence number. Upon receiving the RM cell transmitted from the destination terminal over the backward connection, the branching-and-consolidating node may supply data on that RM cell to the RM cell transmitted first thereto over the forward connection at that point.

By implementing the above-mentioned operation, the data flow system eliminating transmission of redundant RM cells in a unidirectional ring network can be obtained.

As described above, according to the present invention, congested status management tables for ports for receiving RM cells are provided in the branching-and-consolidating node, and consolidated congested status data is transmitted to the source terminal over the backward connection. Consequently, even in the multicast connection network, congestion control is possible which takes into account time delays in transmitting RM cells to the ports. Further, according to the present invention, by selecting a specific branching-and-consolidating node for consolidating RM cells as required, the processing load on the branching-and-consolidating node can be reduced.

Furthermore, the data transmitting rate is regulated based on the most congested port in branched connections, or the data transmitting rate is regulated based on the congested state of a branched connection. Consequently, appropriate data transmission is possible for the multicast connection network.

According to the present invention, data flow control without wasting available bandwidth is possible in the multicast connection network.

Furthermore, a multicast tree connection network can be obtained which actively switches the branching-and-consolidating node according to the addition or reduction of destination terminals.

Furthermore, in the unidirectional ring network, the number of RM cells to be processed and transmitted for data transmission can be reduced.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and equivalents thereto.

What is claimed is:

1. In a multicast connection ATM network system having a multicast connection control apparatus located in a branching-and-consolidating node that connects a port to a source terminal and connects ports to a plurality of destination terminals; for transmitting user cells, RM cells and branching information from the source terminal to the plurality of destination terminals over a forward connection and for consolidating RM cells having an identical sequence number that are asynchronously transmitted from the plurality of destination terminals to the branching-and-consolidating node over a backward connection, the multicast control apparatus comprising:

congested status management table means for managing congested status in all RM cells; and a controller utilizing said congested status management table means to transmit an uncongested status RM cell from the branching-and-consolidating node to the source terminal over the backward connection only after receiving all other uncongested status RM cells having the identical sequence number from the plurality of destination terminals;

said controller also utilizing said congested status management table means to transmit one congested status RM cell from the branching-and-consolidating node to the source terminal over the backward connection and stopping a subsequent transmission of other congested status RM cells having the identical sequence number as the one transmitted congested status RM cell over the backward connection after receiving the congested status RM cell from one of the plurality of destination terminals.

2. The multicast connection control apparatus according to claim 1, wherein in an ER mode, said controller transmitting a congested status RM cell demanding a lower transmission rate to the source terminal when detecting a congested status in the forward connection.

3. The multicast connection control apparatus according to claim 1, said controller transmitting the congested status RM cell to the source terminal when detecting a failure of reception of the uncongested status RM cell in the sequence, and thereafter stops a response to the source terminal in the sequence.

4. The multicast connection control apparatus according to claim 1, said controller transmitting the congested status RM cell to the source terminal when failing to receive the uncongested status RM cell within a specific period of time, and thereafter stops a response to the source terminal in the sequence.

5. The multicast connection control apparatus according to claim 4, said controller transmitting the congested status RM cell to the source terminal when failing to receive the uncongested status RM cell within the specific period of time wherein the specific period of time is determined by a distance and a number of nodes between the branching-and-consolidating node and the destination terminal.

6. The multicast connection control apparatus according to claim 1, wherein the multicast connection control apparatus is provided in a specific node.

7. The multicast connection control apparatus according to claim 6, wherein the multicast connection control apparatus is provided in a branching-and-consolidating node nearest to the source terminal.

8. The multicast connection control apparatus according to claim 1, said controller controlling a congestion response when a number of forward connections from the source terminal exceeds a specific value.

9. The multicast connection control apparatus according to claim 1, said controller controlling the congestion response when a sum of PCRs from the source terminal exceeds a specific value.

10. The multicast connection control apparatus according to claim 1, wherein the branching-and-consolidating node receives a signaling procedure from the source terminal which is used by said controller to control the congested status RM cell.

11. The multicast connection control apparatus according to claim 1, wherein said controller stops controlling a troubled destination terminal until the troubled destination terminal has recovered.

12. The multicast connection control apparatus according to claim 11, wherein a node transmits an operation and maintenance cell over the backward connection for identifying the troubled destination terminal.

13. The multicast connection control apparatus according to claim 1, said controller transmitting the uncongested status RM cell over the backward connection when an uncongested status is detected in a specific port for a specific period of time.

14. The multicast connection control apparatus according to claim 1, the control apparatus being in combination with a selected node bordering a first control segment and a second control segment, the selected node in the first control segment responding as a virtual destination terminal instead of a selected destination terminal, and the selected node in the second control segment controlling a congested status in the second control segment including the selected destination terminal.

15. The multicast connection control apparatus according to claim 14, wherein the selected node has an ICR for the second control segment different from the ICR for the first control segment.

16. The multicast connection control apparatus according to claim 1, said controller transmitting an informing RM cell indicating a control status of the branching-and-consolidating node to a subsequent node.

17. The multicast connection control apparatus according to claim 16, said controller transmitting a second informing RM cell indicating that the multicast connection control apparatus will continue control of the backward connection when failing to receive an acceptance from another node.

18. The multicast connection control apparatus according to claim 1, wherein the network is a unidirectional ring network including ring nodes for writing the congested status of the forward connection into a subsequent RM cell.

19. The multicast connection control apparatus according to claim 18, wherein one of said ring nodes transmits an RM cell having the congested status information as to the forward connection to a destination terminal therefor, and transmits an RM cell having previous congested status information as to the destination terminal therefor to a subsequent ring node in the ring network.

20. A method of controlling a branching-and-consolidating node that connects a port to a source terminal and connects ports to a plurality of destination terminals in a multicast connection ATM mode network, the method comprising the steps of:

transmitting user cells and RM cells including branching information from the source terminal to the plurality of destination terminals over a forward connection;

asynchronously transmitting uncongested status resource management cells and/or congested status resource management cells from the plurality of destination terminals to the branching-and-consolidating node over a backward connection;

consolidating the RM cells having an identical sequence number that are asynchronously transmitted from the plurality of destination terminals;

managing congested status in all RM cells with a plurality of congested status management tables, wherein each port is managed by a corresponding one of the congested status management tables;

transmitting one uncongested status RM cell from the branching-and-consolidating node to the source terminal over the backward connection after receiving all other uncongested RM cells having the identical sequence number from the plurality of destination terminals; and transmitting one congested status RM cell and stopping a subsequent transmission of the congested status RM cells having the identical sequence number as the one transmitted congested status RM cell from the branching-and-consolidating node to the source terminal over the backward connection after receiving the congested status RM cell from one of the plurality of destination terminals.

21. The method of controlling a branching-and-consolidating node according to claim 20, said managing step including the substeps of updating a corresponding one of the congested status management tables when the branching-and-consolidating node receives the RM cell from a respective destination terminal.

* * * * *